US012776520B2

(12) United States Patent
Yushin et al.

(10) Patent No.: US 12,776,520 B2
(45) Date of Patent: Oct. 27, 2026

(54) ELECTROLYTE FOR A METAL-ION BATTERY CELL WITH HIGH-CAPACITY, MICRON-SCALE, VOLUME-CHANGING ANODE PARTICLES

(71) Applicant: Sila Nanotechnologies, Inc., Alameda, CA (US)

(72) Inventors: Gleb Yushin, Atlanta, GA (US); Ashleigh Ward, Oakland, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

(21) Appl. No.: 19/350,727

(22) Filed: Oct. 6, 2025

(65) Prior Publication Data

US 2026/0031404 A1 Jan. 29, 2026

Related U.S. Application Data

(63) Continuation of application No. 18/319,075, filed on May 17, 2023, now abandoned, which is a
(Continued)

(51) Int. Cl.

| | |
|---|---|
| ***H01M 10/0569*** | (2010.01) |
| ***H01M 4/02*** | (2006.01) |
| ***H01M 4/134*** | (2010.01) |
| ***H01M 4/38*** | (2006.01) |
| ***H01M 4/525*** | (2010.01) |

(Continued)

(52) U.S. Cl.
CPC ....... *H01M 10/0569* (2013.01); *H01M 4/134* (2013.01); *H01M 4/386* (2013.01); *H01M 4/525* (2013.01); *H01M 10/0525* (2013.01); *H01M 10/0567* (2013.01); *H01M 10/0568* (2013.01);
(Continued)

(58) Field of Classification Search
CPC ............. H01M 10/0569; H01M 4/386; H01M 10/0567; H01M 2004/021; H01M 10/0568; H01M 2300/0037
See application file for complete search history.

(56) References Cited

U.S. PATENT DOCUMENTS

2009/0017386 A1* 1/2009 Xu ........................ H01M 4/621 29/623.2
2011/0111305 A1* 5/2011 Jeon ................. H01M 10/0567 429/231.95

(Continued)

OTHER PUBLICATIONS

Trunschke, A. "Surface area and pore size determination," Modern Methods in Heterogeneous Catalysis Research, Nov. 1, 2013.

*Primary Examiner* — Imran Akram
(74) *Attorney, Agent, or Firm* — MUNCY, GEISSLER, OLDS & LOWE, P.C.; Daniel Podhajny

(57) ABSTRACT

In an embodiment, a metal-ion battery cell comprises an anode electrode, a cathode electrode, a separator, and electrolyte ionically coupling the anode electrode and the cathode electrode. The anode electrode is a high-capacity electrode (e.g., in the range of about 2 $mAh/cm^2$ to about 10 $mAh/cm^2$). The electrolyte includes a solvent composition, the solvent composition including low-melting point (LMP) solvent(s) in the range from about 10 vol. % to about 80 vol. % of the solvent composition as well as regular-melting point (RMP) solvent(s) in the range from about 20 vol. % to about 90 vol. % of the solvent composition.

22 Claims, 10 Drawing Sheets

Related U.S. Application Data continuation of application No. 17/453,784, filed on Nov. 5, 2021, now Pat. No. 11,664,537, which is a continuation of application No. 16/128,340, filed on Sep. 11, 2018, now Pat. No. 11,171,362.

(60) Provisional application No. 62/557,416, filed on Sep. 12, 2017.

(51) Int. Cl.

| | |
|---|---|
| ***H01M 10/0525*** | (2010.01) |
| ***H01M 10/0567*** | (2010.01) |
| ***H01M 10/0568*** | (2010.01) |

(52) U.S. Cl.

CPC ................. *H01M 2004/021* (2013.01); *H01M 2300/0034* (2013.01); *H01M 2300/0037* (2013.01)

(56) References Cited

U.S. PATENT DOCUMENTS

| | | | | |
|---|---|---|---|---|
| 2011/0207000 | A1* | 8/2011 | Jow | H01M 4/133<br>429/188 |
| 2012/0100417 | A1* | 4/2012 | Ramprasad | H01M 10/0567<br>429/188 |
| 2013/0029230 | A1* | 1/2013 | Park | H01M 6/168<br>429/188 |
| 2013/0089794 | A1* | 4/2013 | Kim | H01M 4/13<br>429/188 |
| 2016/0155577 | A1* | 6/2016 | Takahashi | H01M 10/0568<br>252/62.2 |
| 2016/0204432 | A1* | 7/2016 | Koshiba | H01M 4/5825<br>29/623.2 |
| 2017/0084916 | A1* | 3/2017 | Oka | H01M 10/0567 |
| 2017/0170477 | A1* | 6/2017 | Sakshaug | C04B 41/009 |
| 2017/0207459 | A1* | 7/2017 | Okada | H01G 11/60 |

* cited by examiner

| | | | | | |
|---|---|---|---|---|---|
| METHYL FORMATE<br>$C_2H_4O_2$<br>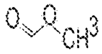<br>MP: -99°C<br>BP: + 32°C<br>FP: -19°C<br>n=1.34 | ETHYL FORMATE<br>$C_3H_6O_2$<br><br>MP: -80.5°C(?)<br>BP: + 54.5°C<br>FP: -20°C<br>n=1.36 | N-PROPYL FORMATE<br>$C_4H_8O_2$<br><br>MP: -93°C<br>BP: + 81°C<br>FP: -4°C<br>n=1.38v | BUTYL FORMATE<br>$C_5H_{10}O_2$<br><br>MP: -90°C<br>BP: + 107°C<br>FP: +14°C<br>n=1.39 | AMYL FORMATE<br>$C_6H_{12}O_2$<br><br>MP: -73°C<br>BP: + 130°C<br>FP: +32°C<br>n=1.40 | HEXYL FORMATE<br>$C_7H_{14}O_2$<br>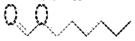<br>MP: -63°C<br>BP: + 155°C<br>FP: +48°C<br>n=1.40 |
| METHYL ACETATE<br>$C_3H_6O_2$<br>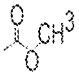<br>MP: -98°C<br>BP: + 57°C<br>FP: -9°C<br>n=1.36 | ETHYL ACETATE<br>$C_4H_8O_2$<br>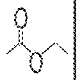<br>MP: -84°C(?)<br>BP: + 77°C<br>FP: +3°C<br>n=1.37 | PROPYL ACETATE<br>$C_5H_{10}O_2$<br>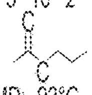<br>MP: -93°C<br>BP: + 102°C<br>FP: +13°C<br>n=1.38 | BUTYL ACETATE<br>$C_6H_{12}O_2$<br>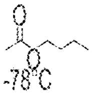<br>MP: -78°C<br>BP: + 126°C<br>FP: +22°C<br>n=1.40 | AMYL ACETATE<br>$C_7H_{14}O_2$<br>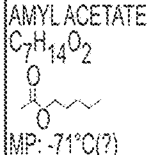<br>MP: -71°C(?)<br>BP: + 149°C<br>FP: +34°C<br>n=1.40 | HEXYL ACETATE<br>$C_8H_{16}O_2$<br><br>MP: -80°C<br>BP: + 170°C<br>FP: +37°C<br>n=1.41 |
| METHYL PROPIONATE<br>$C_4H_8O_2$<br>MP: -88°C<br>BP: + 80°C<br>FP: +6°C<br>n=1.38 | ETHYL PROPIONATE<br>$C_5H_{10}O_2$<br>MP: -74°C(?)<br>BP: + 99°C<br>FP: +12°C<br>n=1.39 | PROPYL PROPIONATE<br>$C_6H_{12}O_2$<br>MP: -76°C<br>BP: + 122°C<br>FP: +19°C<br>n=1.39 | BUTYL PROPIONATE<br>$C_7H_{14}O_2$<br>MP: -89°C<br>BP: + 145°C<br>FP: +38°C<br>n=1.40 | AMYL PROPIONATE<br>$C_8H_{16}O_2$<br>MP: -73°C<br>BP: + 168°C<br>FP: +52°C<br>n=1.42 | HEXYL PROPIONATE<br>$C_9H_{18}O_2$<br>MP: -58°C<br>BP: + 190°C<br>FP: +65°C<br>n=1.42 |
| **METHYL BUTYRATE**<br>$C_5H_{10}O_2$<br>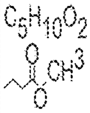<br>MP: -95°C<br>BP: + 103°C<br>FP: +12°C<br>n=1.39 | ETHYL BUTYRATE<br>$C_6H_{12}O_2$<br>MP: -93°C<br>BP: + 121°C<br>FP: +26°C<br>n=1.40 | PROPYL BUTYRATE<br>$C_7H_{14}O_2$<br>MP: -95°C<br>BP: + 142°C<br>FP: +37°C<br>n=1.40 | BUTYL BUTYRATE<br>$C_8H_{16}O_2$<br>MP: -91°C<br>BP: + 165°C<br>FP: +53°C<br>n=1.41 | AMYL BUTYRATE<br>$C_9H_{18}O_2$<br>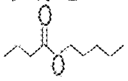<br>MP: -73°C<br>BP: + 185°C<br>FP: +67°C<br>n=1.42 | HEXYL BUTYRATE<br>$C_{10}H_{20}O_2$<br>MP: -78°C<br>BP: + 208°C<br>FP: +81°C<br>n=1.42 |
| METHYL VALERATE<br>$C_6H_{12}O_2$<br>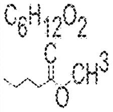<br>MP: -91°C<br>BP: + 128°C<br>FP: +22°C<br>n=1.40 | ETHYL VALERATE<br>$C_7H_{14}O_2$<br>MP: -91°C<br>BP: + 146°C<br>FP: +39°C<br>n=1.40 | PROPYL VALERATE<br>$C_8H_{16}O_2$<br>MP: -71°C<br>BP: + 168°C<br>FP: +52°C<br>n=1.41 | BUTYL VALERATE<br>$C_9H_{18}O_2$<br>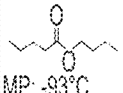<br>MP: -93°C<br>BP: + 187°C<br>FP: +65°C<br>n=1.42 | AMYL VALERATE<br>$C_{10}H_{20}O_2$<br>MP: -79°C<br>BP: + 207°C<br>FP: +78°C<br>n=1.42 | HEXYL VALERATE<br>$C_{11}H_{22}O_2$<br>MP: -63°C<br>BP: + 226°C<br>FP: +88°C<br>n=1.42 |
| METHYL CAPROATE<br>$C_7H_{14}O_2$<br>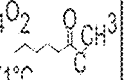<br>MP: -71°C<br>BP: + 150°C<br>FP: +45°C<br>n=1.40 | ETHYL CAPROATE<br>$C_8H_{16}O_2$<br>MP: -67°C<br>BP: + 168°C<br>FP: | PROPYL CAPROATE<br>$C_9H_{18}O_2$<br>MP: -68°C<br>BP: + 188°C<br>FP:<br>n=1.42 | BUTYL CAPROATE<br>$C_{10}H_{20}O_2$<br>MP: -64°C<br>BP: + 207°C<br>FP:<br>n=1.42 | AMYL CAPROATE<br>$C_{11}H_{22}O_2$<br>MP: -57°C<br>BP: + 226°C<br>FP: +88°C<br>n=1.43 | HEXYL CAPROATE<br>$C_{12}H_{24}O_2$<br>MP: -55°C (?)<br>BP: + 245°C<br>FP: |

TO FIG. 2 CONT. →

FIG. 2

ELECTROLYTE FOR A METAL-ION BATTERY CELL WITH HIGH-CAPACITY, MICRON-SCALE, VOLUME-CHANGING ANODE PARTICLES

CLAIM OF PRIORITY

The present application for patent is a Continuation of U.S. Non-Provisional application Ser. No. 18/319,075, entitled "Electrolyte for a Metal-Ion Battery Cell with High-Capacity, Micron-Scale, Volume-Changing Anode Particles," May 17, 2023, which is in turn a Continuation of U.S. Non-Provisional application Ser. No. 17/453,784, entitled "Electrolyte for a Metal-Ion Battery Cell with High-Capacity, Micron-Scale, Volume-Changing Anode Particles," Nov. 5, 2021, which is in turn a Continuation of U.S. Non-Provisional application Ser. No. 16/128,340, entitled "Electrolyte for a Metal-Ion Battery Cell with High-Capacity, Micron-Scale, Volume-Changing Anode Particles," filed Sep. 11, 2018, which in turn claims the benefit of U.S. Provisional Application No. 62/557,416, entitled "Improved Liquid Electrolytes for Cells with High-Capacity Anodes based on Micron-Scale Volume-Changing Particles," filed Sep. 12, 2017, each of which is expressly incorporated herein by reference in its entirety.

BACKGROUND

Field

The present disclosure relates generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for applications in low- or zero-emission, hybrid-electrical or fully-electrical vehicles, consumer electronics, wearable devices, energy-efficient cargo ships and locomotives, drones, aerospace applications, and power grids. In particular, further improvements are desired for various rechargeable batteries, such as rechargeable Li and Li-ion batteries, rechargeable Na and Na-ion batteries, rechargeable K and K-ion batteries, rechargeable Ca and Ca-ion batteries, and rechargeable Mg and Mg-ion batteries, to name a few.

A broad range of electrolyte compositions may be utilized in the construction of Li and Li-ion batteries and other metal and metal-ion batteries. However, for improved cell performance (e.g., low and stable resistance, high cycling stability, high rate capability, etc.), the optimal choice of electrolyte needs to be developed for specific types and specific sizes of active particles in both the anode and cathode, as well as the specific operational conditions (e.g., temperature, charge rate, discharge rate, voltage range, capacity utilization, etc.). In many cases, the choice of electrolyte components and their ratios is not trivial and can be counter-intuitive.

In certain types of rechargeable batteries, charge storing anode materials may be produced as high-capacity (nano) composite powders, which exhibit moderately high volume changes (e.g., 8-180 vol. %) during the first charge-discharge cycle and moderate volume changes (e.g., 5-50 vol. %) during the subsequent charge-discharge cycles. A subset of such charge-storing anode particles includes anode particles with an average size (e.g., diameter or thickness) in the range of around 0.2 to around 40 microns. Such a class of charge-storing particles offers great promises for scalable manufacturing and achieving high cell-level energy density and other performance characteristics. Unfortunately, such particles are relatively new and their use in cells using conventional electrolytes may result in relatively poor cell performance characteristics and limited cycle stability. Cell performance may become particularly poor when the high-capacity (nano)composite anode capacity loading (areal capacity) becomes moderate (e.g., 2-4 $mAh/cm^2$) and even more so when the areal capacity becomes high (e.g., 4-10 $mAh/cm^2$). Higher capacity loading, however, is advantageous for increasing cell energy density and reducing cell manufacturing costs. Similarly, cell performance may degrade when the porosity of such an anode (e.g., the volume occupied by the spacing between the (nano)composite active anode particles in the electrode and filled with electrolyte) becomes moderately small (e.g., 25-35 vol. % after the first charge-discharge cycle) and more so when the porosity of the anode becomes small (e.g., 5-25 vol. % after the first charge-discharge cycle) or when the amount of a binder and conductive additives in the electrode becomes moderately small (e.g., 5-15 wt. %) and more so when the amount of the binder and conductive additives in the electrode becomes small (e.g., 0.5-5 wt. %). Higher electrode density and lower binder and conductive additive content, however, are advantageous for increasing cell energy density and reducing cost. Lower binder content may also be advantageous for increasing cell rate performance.

Examples of materials that exhibit moderately high volume changes (e.g., 8-180 vol. %) during the first charge-discharge cycle and moderate volume changes (e.g., 5-50 vol. %) during the subsequent charge-discharge cycles include (nano)composites comprising so-called conversion-type (which includes both so-called chemical transformation and so-called "true conversion" sub-classes) and so-called alloying-type active electrode materials. In the case of metal-ion batteries (such as Li-ion batteries), examples of such conversion-type active electrode materials include, but are not limited to, metal fluorides (such as lithium fluoride, iron fluoride, cupper fluoride, bismuth fluoride, their mixtures and alloys, etc.), metal chlorides, metal iodides, metal bromides, metal chalcogenides (such as sulfides, including lithium sulfide and other metal sulfides), sulfur, selenium, metal oxides (including but not limited to lithium oxide and silicon oxide), metal nitrides, metal phosphides (including lithium phosphide), metal hydrides, and others. In the case of metal-ion batteries (such as Li-ion batteries), examples of such alloying-type electrode materials include, but are not limited to, silicon, germanium, antimony, aluminum, magnesium, zinc, gallium, arsenic, phosphorous, silver, cadmium, indium, tin, lead, bismuth, their alloys, and others. These materials typically offer higher gravimetric and volumetric capacity than so-called intercalation-type electrodes commonly used in commercial metal-ion (e.g., Li-ion) batteries. Alloying-type electrode materials are particularly advantageous for use in certain high-capacity anodes for Li-ion batteries. Silicon-based alloying-type anodes may be particularly attractive for such applications.

Accordingly, there remains a need for improved batteries, components, and other related materials and manufacturing processes.

SUMMARY

Embodiments disclosed herein address the above stated needs by providing improved batteries, components, and other related materials and manufacturing processes.

As an example, a metal-ion battery cell comprises anode and cathode electrodes, wherein the anode electrode has a capacity loading in the range of about 2 $mAh/cm^2$ to about 10 $mAh/cm^2$ and comprises anode particles that (i) have an average particle size in the range of about 0.2 microns to about 20 microns, (ii) exhibit a volume expansion in the range of about 8 vol. % to about 180 vol. % during one or more charge-discharge cycles of the battery cell, and (iii) exhibit a specific capacity in the range of about 550 mAh/g to about 2200 mAh/g. The metal-ion battery cell further comprises a separator electrically separating the anode electrode and the cathode electrode, and an electrolyte ionically coupling the anode electrode and the cathode electrode, wherein the electrolyte comprises one or more metal-ion salts and a solvent composition. The solvent composition comprises one or more low-melting point solvents that each have a melting point in the range from about −140° C. to about −60° C. and are in the range from about 10 vol. % to about 80 vol. % of the solvent composition, and one or more regular-melting point solvents that each have a melting point in the range from about −60° C. to about +30° C. and are in the range from about 20 vol. % to about 90 vol. % of the solvent composition.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1:
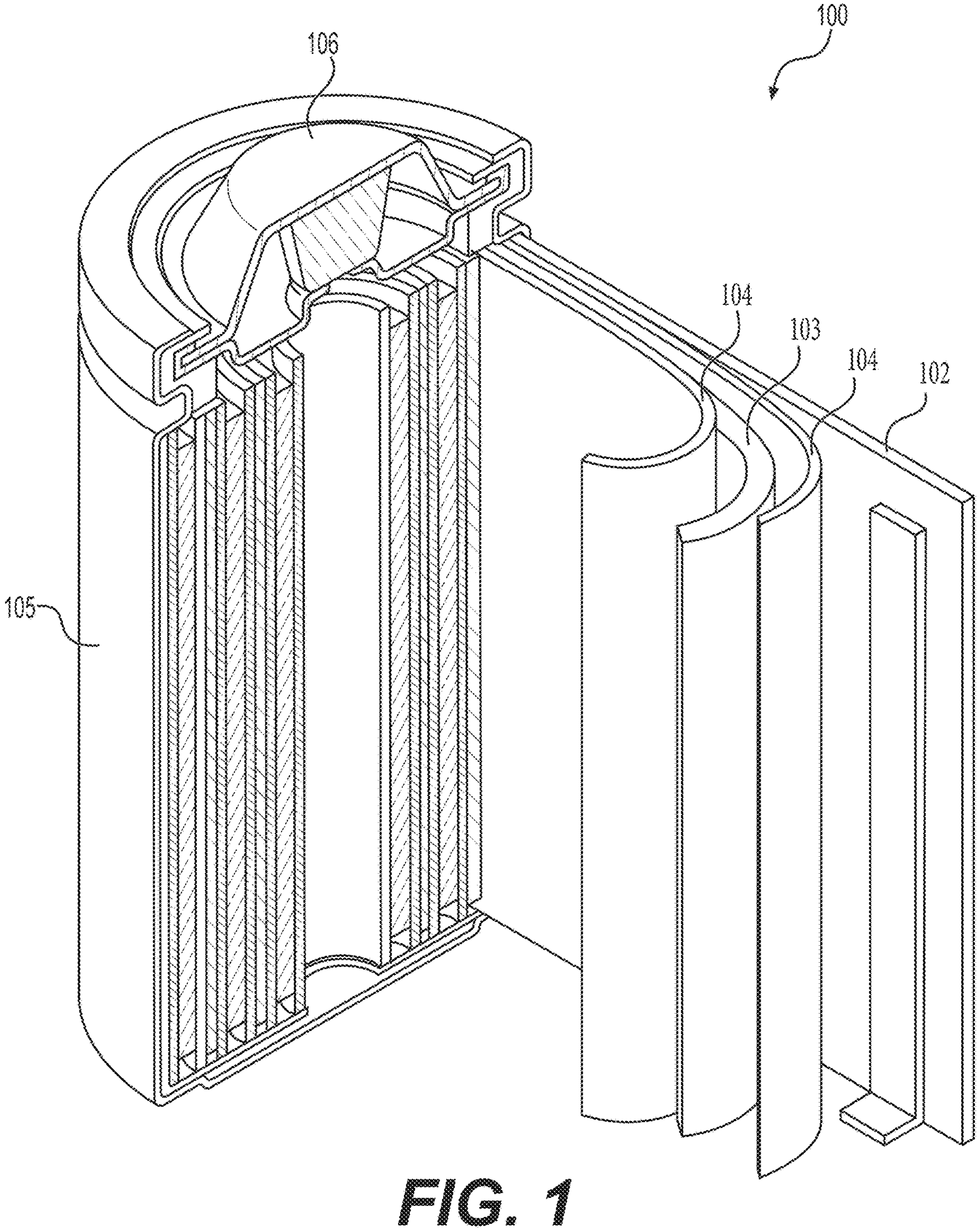
FIG. 1 illustrates an example Li-ion battery in which the components, materials, methods, and other techniques described herein may be implemented.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119° C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion, and other metal and metal-ion batteries, etc.). Further, while the description below may also describe certain examples of the material formulations in a Li-free state (for example, as in silicon-comprising nanocomposite anodes), it will be appreciated that various aspects may be applicable to Li-containing electrodes and active materials (for example, partially or fully lithiated Si-comprising anodes, partially or fully lithiated metal fluoride comprising cathodes (such as a mixture of LiF and metals such as Cu, Fe, Cu—Fe alloys, various other alloys and mixtures of metals, etc.), partially or fully lithiated chalcogenides (such as $Li_2S$, $Li_2S$/metal mixtures, $Li_2Se$, $Li_2Se$/metal mixtures, $Li_2S$—$Li_2Se$ mixtures, various other compositions comprising lithiated chalcogenides etc.), partially or fully lithiated metal oxides (such as $Li_2O$, $Li_2O$/metal mixtures, etc.), among others).

Further, while the description below may describe certain examples in the context of some specific alloying-type and conversion-type chemistries of anode and cathode active materials for Li-ion batteries (such as silicon-comprising anodes or metal fluoride-comprising or lithium sulfide-comprising cathodes), it will be appreciated that various aspects may be applicable to other chemistries for Li-ion batteries (other conversion-type and alloying-type electrodes as well as various intercalation-type electrodes) as well as to other battery chemistries. In the case of metal-ion batteries (such as Li-ion batteries), examples of other suitable conversion-type electrodes include, but are not limited to, metal chlorides, metal iodides, metal bromides, sulfur, selenium, metal oxides, metal nitrides, metal phosphides, metal hydrides, and others.

During battery (such as a Li-ion battery) operation, conversion materials change (convert) from one crystal structure to another (hence the name "conversion"-type). This process is also accompanied by breaking chemical bonds and forming new ones. During (e.g., Li-ion) battery operation, Li ions are inserted into alloying type materials forming lithium alloys (hence the name "alloying"-type). Sometimes, "alloying"-type electrode materials are considered to be a sub-class of "conversion"-type electrode materials.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (shown implicitly) impregnating the separator 104, a battery case 105, and a sealing member 106 sealing the battery case 105.

Conventional electrolytes for Li- or Na-based batteries of this type are generally composed of a 0.8-1.2 M (1M±0.2 M) solution of a single Li or Na salt (such as $LiPF_6$ for Li-ion batteries and $NaPF_6$ or $NaClO_4$ salts for Na-ion batteries) in a mixture of carbonate solvents with 1-2 wt. % of other organic additives. Common organic additives may include nitriles, esters, sulfones, sulfoxides, phosphorous-based solvents, silicon-based solvents, ethers, and others. Such additive solvents may be modified (e.g., sulfonated or fluorinated).

The conventional salt used in most conventional Li-ion battery electrolytes is $LiPF_6$. Examples of less common salts (e.g., explored primarily in research publications or, in some cases, never even described in Li-ion battery electrolyte applications, but may still be applicable and useful) include: lithium tetrafluoroborate ($LiBF_4$), lithium perchlorate ($LiClO_4$), lithium hexafluoroantimonate ($LiSbF_6$), lithium hexafluorosilicate ($Li_2SiF_6$), lithium hexafluoroaluminate ($Li_3AlF_6$), lithium bis(oxalato)borate ($LiB(C_2O_4)_2$, lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), and others.

Electrodes utilized in Li-ion batteries are typically produced by (i) formation of a slurry comprising active materials, conductive additives, binder solutions and, in some cases, surfactant or other functional additives; (ii) casting the slurry onto a metal foil (e.g., Cu foil for most anodes and Al foil for most cathodes); and (iii) drying the casted electrodes to completely evaporate the solvent.

Conventional anode materials utilized in Li-ion batteries are of an intercalation-type. Metal ions are intercalated into and occupy interstitial positions of such materials during the charge or discharge of a battery. Such anodes experience small or very small volume changes when used in electrodes. Polyvinylidene fluoride, or polyvinylidene difluoride (PVDF), and carboxymethyl cellulose (CMC) are the two most common binders used in these electrodes. Carbon black is the most common conductive additive used in these electrodes. However, such anodes exhibit relatively small gravimetric and volumetric capacities (typically less than 370 mAh/g rechargeable specific capacity in the case of graphite- or hard carbon-based anodes and less than 600 mAh/$cm^3$ rechargeable volumetric capacity at the electrode level without considering the volume of the current collector foils).

Alloying-type anode materials for use in Li-ion batteries offer higher gravimetric and volumetric capacities compared to intercalation-type anodes. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to Si-carbon composites, Si-metal composites, Si-polymer composites, Si-ceramic composites, composites comprising various combinations of nanostructured Si, carbon, polymer, ceramic and metal or other types of porous composites comprising nanostructured Si or nanostructured or nano-sized Si particles of various shapes and forms) may reduce volume changes during Li-ion insertion and extraction, which, in turn, may lead to better cycle stability in rechargeable Li-ion cells.

In addition to Si-comprising nanocomposite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their alloys, and others.

In addition to (nano)composite anodes comprising alloying-type active materials, other interesting types of high capacity (nano)composite anodes may comprise metal oxides (including silicon oxide, lithium oxide, etc.), metal nitrides, metal phosphides (including lithium phosphide), metal hydrides, and others.

In particular, high-capacity (nano)composite anode powders, which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from around 0.2 to around 40 microns (for some applications, more preferably from around 0.4 to around 20 microns) may be particularly attractive for battery applications in terms of manufacturability and performance characteristics. Electrodes with electrode areal capacity loading from moderate (e.g., about 2-about 4 mAh/$cm^2$) to high (e.g., about 4-about 10 mAh/$cm^2$) are also particularly attractive for use in cells. In some designs, a near-spherical (spheroidal) shape of these composite particles may additionally be very attractive for increasing rate performance and volumetric capacity of the electrodes. In spite of some improvements that may be achieved with the formation and utilization of such alloying-type or conversion-type active material(s)' comprising nanocomposite anode materials as well as electrode formulations, however, substantial additional improvements in cell performance characteristics may be achieved with the improved composition and preparation of electrolytes (e.g., liquid electrolytes), beyond what is known or shown by the conventional state-of-the-art. Unfortunately, high-capacity (nano)composite anode and cathode powders, which exhibit moderately high volume changes (e.g., about 8-about 180 vol. %) during the first charge-discharge cycle, moderate volume changes (e.g., about 4-about 50 vol. %) during the subsequent charge-discharge cycles, an average size in the range from around 0.2 to around 40 microns and relatively low density (e.g., about 0.5-3.8 g/cc), are relatively new and their performance characteristics and limited cycle stability are typically relatively poor, particularly if electrode areal capacity loading is moderate (e.g., about 2-about 4 $mAh/cm^2$) and even more so if it is high (e.g., about 4-about 10 $mAh/cm^2$). Higher capacity loading, however, is advantageous for increasing cell energy density and reducing cell manufacturing costs. Similarly, the cell performance may suffer when such an electrode (e.g., anode) porosity (volume occupied by the spacing between the (nano)composite active anode particles in the electrode and filled with electrolyte) becomes moderately small (e.g., about 25-about 35 vol. %) and more so when it becomes small (e.g., about 5-about 25 vol. %) or when the amount of the binder and conductive additives in the electrode becomes moderately small (e.g., about 6-about 15 wt. %, total) and more so when it becomes small (e.g., about 0.5-about 5 wt. %, total). Higher electrode density and lower binder content, however, are advantageous for increasing cell energy density and reducing cost in certain applications. Lower binder content may also be advantageous for increasing cell rate performance. Larger volume changes lead to inferior performance in some designs, which may be related to damages in the solid electrolyte interphase (SEI) layer formed on the anode, to the non-uniform lithiation and de-lithiation of the electrode particles within the electrodes, and other factors.

Surprisingly, the inventors have found that electrolyte compositions that work well for intercalation-type anode and cathode electrodes (of various particle size) as well as electrolytes that show improved performance for nano-sized (e.g., in the range from about 1 nm to about 200 nm) conversion-type anode materials and conversion-type cathode materials or nano-sized (typically in the range from 1 nm to 200 nm) alloying-type anode materials, perform poorly in cells comprising high-capacity (nano)composite anode particles (e.g., powders), which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from around 0.2 to around 40 microns. Furthermore, electrolytes which typically perform poorly in cells with conventional nano-sized (e.g., in the range from about 1 nm to about 200 nm) alloying-type anodes, were found to perform markedly better in cells comprising high-capacity (nano) composite anode particles (e.g., powders), which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from around 0.2 to around 40 microns. The impact of changes in the electrolyte composition on the otherwise improved cell performance with such (nano)composite anodes comprising alloying-type anode materials was found to be particularly strong for certain applications. In particular, identifying electrolyte compositions for the improved performance of a sub-class of such anode powders with specific surface area in the range from around 0.5 $m^2/g$ to around 50 $m^2/g$ was found to be particularly valuable and impactful for achieving a combination of good stability, good energy density, and other performance characteristics.

In an example, for those anode materials that comprise silicon (Si), the (nano)composite electrodes with gravimetric capacities in the range from around 600 mAh/g to around 2200 mAh/g or around 2600 mAh/g (normalized by the total mass of (nano)composite particles, binders and conductive additives combined) were particularly valuable because the combination of the disclosed electrolyte compositions with such anodes allowed cells to achieve an attractive combination of good stabilities, good energy density, good rate performance, and other important and desired performance characteristics.

One or more embodiments of the present disclosure overcome some of the above-discussed challenges of various types of cells comprising nanocomposite anode materials (for example, materials comprising conversion-type and alloying-type active materials) that experience certain volume changes during cycling (for example, moderately high volume changes (e.g., about 8-about 160 or about 180 vol. %) during the first charge-discharge cycle and moderate volume changes (e.g., about 4-about 50 vol. %) during the subsequent charge-discharge cycles), an average particle size in the range from around 0.2 to around 40 microns and a specific surface area in the range from around 0.5 to around 50 $m^2/g$ for a broad range of batteries. In accordance with one or more embodiments, substantially more stable cells may be formulated with such electrodes in moderate (e.g., about 2-about 4 $mAh/cm^2$) and high capacity loadings (e.g., about 4-about 10 $mAh/cm^2$), high packing density (electrode porosity filled with electrolyte in the range from about 5 to about 35 vol. % after the first charge-discharge cycle) and relatively low binder content (e.g., about 0.5-about 14 wt. %).

Conventional cathode materials utilized in Li-ion batteries are of an intercalation-type and commonly crystalline. Such cathodes typically exhibit a highest charging potential of less than around 4.3 V vs. Li/Li+, gravimetric capacity less than about 190 mAh/g (based on the mass of active material) and volumetric capacity of less than about 800 $mAh/cm^3$ (based on the volume of the electrode and not counting the volume occupied by the current collector foil). For given anodes, higher energy density in Li-ion batteries may be achieved either by using high-voltage cathodes (cathodes with a highest charging potential from around 4.35 V vs. Li/Li+ to around 5.1 V vs. Li/Li+) or by using so-called conversion-type cathode materials (including, but not limited to those that comprise F or S in their composition). Some high-voltage intercalation-type cathodes may comprise nickel (Ni). Some high-voltage intercalation-type cathodes may comprise manganese (Mn). Some high-voltage intercalation-type cathodes may comprise cobalt (Co). In some designs, high-voltage intercalation-type cathode particles may comprise fluorine (F) in their structure or the surface layer. Some high-voltage intercalation-type cathodes may comprise phosphorous (P). Combination of such types of higher energy density cathodes with high-capacity (e.g., Si based) anodes may result in high cell-level energy density. Unfortunately, the cycle stability and other performance characteristics of such cells may not be sufficient for some applications, at least when used in combination with conventional electrolytes.

One or more embodiments of the present disclosure are thereby directed to electrolyte compositions that work well for a combination of high voltage intercalation cathodes (cathodes with the highest charging potential in the range from about 4.2 V to about 4.5 V vs. Li/Li+ and, in some cases, from about 4.5 V vs. Li/Li+ to about 5.1 V vs. Li/Li+) with a sub-class of high-capacity moderate volume changing anodes (e.g., anodes comprising (nano)composite anode powders, which exhibit moderately high volume changes (e.g., about 8-about 160 or about 180 vol. %) during the first charge-discharge cycle, moderate volume changes (e.g., about 4-about 50 vol. %) during the subsequent charge-discharge cycles, an average size (e.g., average diameter) in the range from around 0.2 to around 40 microns and specific surface area in the range from around 0.5 to around 50 $m^2/g$ normalized by the mass of the composite electrode particles and, in the case of Si-comprising anodes, specific capacities in the range from around 550 to around 2200 mAh/g or around 2700 mAh/g (when normalized by the total mass of the composite anode particles, conductive additives and binders) or in the range from around 650 to around 2200 mAh/g or around 2900 mAh/g (when normalized by the mass of the composite anode particles only)). In at least one embodiment, a particular electrolyte composition may selected based on the value of the highest cathode charge potential.

Examples of high specific and high volumetric capacity conversion-type cathode materials include, but are not limited to, fluorides, chlorides, sulfides, selenides, and others. For example, fluoride-based cathodes may offer outstanding technological potential due to their very high capacities, in some cases exceeding 300 mAh/g (greater than 1200 mAh/$cm^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; $ZnF_2$ offers a theoretical specific capacity of 519 mAh/g. AgF and $AgF_2$ also offer theoretical specific capacities and additionally exhibit very high lithiation potential. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). The use of metal fluorides mixed with metals may also sometimes be advantageous (e.g., may offer higher rates, lower resistance, higher practical capacity, or longer stability). In a fully lithiated state, metal fluorides covert to a composite comprising a mixture of metal and LiF clusters (or nanoparticles). Examples of the overall reversible reactions of the conversion-type metal fluoride cathodes may include $2Li+CuF_2 \leftrightarrow 2LiF+Cu$ for $CuF_2$-based cathodes or $3Li+FeF_3 \leftrightarrow 3LiF+Fe$ for $FeF_3$-based cathodes). It will be appreciated that metal fluoride-based cathodes may be prepared in both Li-free or partially lithiated or fully lithiated states. Another example of a promising conversion-type cathode (or, in some cases, anode) material is sulfur (S) (in a Li-free state) or lithium sulfide ($Li_2S$, in a fully lithiated state). In order to reduce dissolution of active material during cycling, to improve electrical conductivity, or to improve mechanical stability of $S/Li_2S$ electrodes, one may utilize formation of porous S, $Li_2S$, porous S—C composites, $Li_2S$—C composites, porous S-polymer composites, or other composites comprising S or $Li_2S$, or both.

Note that in some designs, different electrolyte composition may offer the most favorable performance for cells comprising identical anodes (e.g., Si-comprising nanocomposite anodes) and different cathodes (intercalation-type, high voltage intercalation-type, conversion type comprising S, conversion-type comprising F, etc.)

Unfortunately, many conversion-type electrodes used in Li-ion batteries suffer from performance limitations. Formation of (nano)composites may, at least partially, overcome such limitations. For example, certain (nano)composites may provide reduced voltage hysteresis, improved capacity utilization, improved rate performance, improved mechanical and sometimes improved electrochemical stability, reduced volume changes, and/or other positive attributes. Examples of such composite cathode materials include, but are not limited to, LiF—Cu—Fe—C nanocomposites, LiF—Cu—Fe—Ag—C nanocomposites, LiF—Cu—Fe—Ti—C nanocomposites, LiF—Cu—Fe—Mn—C nanocomposites, $FeF_2$—C nanocomposites, $FeF_3$—C nanocomposites, $CuF_2$—C nanocomposites, $CuF_2$—C—$AlF_3$ nanocomposites, $CuF_2$—C—$Al_2O_3$ nanocomposites, LiF—Cu—C nanocomposites, LiF—Cu—C-polymer nanocomposites, LiF—Cu-another metal-C-polymer nanocomposites, LiF—Cu-another metal oxide-C-polymer nanocomposites, LiF—Cu-another metal fluoride-C-polymer nanocomposites, LiF—Cu-metal-polymer nanocomposites, and many other porous nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, $ZnF_2$, AgF, $AlF_3$, $AgF_2$ or other metal fluorides or their mixtures. Such composites may also comprise oxides and oxyfluorides and may comprise conductive (mostly $sp^2$-bonded) carbon. In some examples, metal fluoride nanoparticles may be infiltrated into the pores of porous carbon (for example, into the pores of activated carbon particles) to form these metal fluoride-C or mixed metals-LiF-another metal oxide or metal fluoride-C nanocomposites, among other related compositions. In particular, high-capacity (nano)composite cathode particles (e.g., powders), which exhibit moderately high (for a cathode) volume changes (e.g., about 5-about 100 vol. %) during the first charge-discharge cycle, moderate volume changes (e.g., about 4-about 50 vol. %) during the subsequent charge-discharge cycles, and an average size (for example, a diameter, in the case of spherical particles or, a thickness, in the case of flattened or particles or, an average dimensions, in the case of randomly-shaped particles) in the range from around 0.2 micron to around 40 microns may be particularly attractive for battery applications in terms of manufacturability and performance characteristics. In some designs, a near-spherical (spheroidal) shape of the composite cathode particles is additionally very attractive for optimizing rate performance and volumetric capacity of the electrodes. Despite some improvements that may be achieved with the formation and utilization of such conversion-type nanocomposite cathode materials and electrode optimization, however, additional improvements in cell performance characteristics may be achieved with the improved composition and preparation of electrolytes, beyond what is known or shown by the conventional state-of-the art.

One or more embodiments of the present disclosure are thereby directed to electrolyte compositions that work well for a combination of (i) high capacity conversion-type (nano)composite cathode materials which exhibit moderate volume changes (e.g., about 5-about 50 vol. %) during the first charge-discharge cycle and small-to-moderate volume changes (e.g., about 3-about 40 vol. %) during the subsequent charge-discharge cycles, and an average size (for example, a diameter, in the case of spherical particles) in the range from around 0.2 to around 40 microns with (ii) a sub-class of high-capacity moderate volume changing anodes: anodes comprising (nano)composite anode powders, which exhibit moderately high volume changes (e.g., about 8-about 160 or about 180 vol. %) during the first charge-discharge cycle, moderate volume changes (e.g., about 4-about 50 vol. %) during the subsequent charge-discharge cycles, an average size (e.g., average diameter) in the range from about 0.2 to around 40 microns and specific surface area in the range from about 0.5 to around 50 $m^2/g$ normalized by the mass of the active electrode particles and, in the case of Si-comprising anodes, specific capacities in the range from about 550 to about 2200 mAh/g or about 2700 mAh/g (when normalized by the total mass of the composite electrode particles, conductive additives and binders) or in the range from about 650 to about 2200 mAh/g or about 2900 mAh/g (when normalized by the mass of the composite anode particles only)).

The inventors have found that cells comprising electrodes based on high capacity nanocomposite particles or powders (comprising conversion- or alloying-type active materials) that experience certain volume changes during cycling (moderately high volume changes (e.g., an increase by about 8-about 180 vol. % or a reduction by about 8-about 70 vol. %) during the first charge-discharge cycle and moderate volume changes (e.g., about 4-about 50 vol. %) during the subsequent charge-discharge cycles) and an average size in the range from around 0.2 to around 40 microns (such as Si-based nanocomposite anode powders, among many others) may benefit from specific compositions of electrolytes that provide significantly improved performance (particularly for high capacity loadings).

For example, (i) continuous volume changes in high capacity nanocomposite particles during cycling in combination with (ii) electrolyte decomposition on the electrically conductive electrode surface at electrode operating potentials (e.g., mostly electrochemical electrolyte reduction in the case of Si-based anodes) may lead to a continuous (even if relatively slow) growth of a solid electrolyte interphase (SEI) layer on the surface of the nanocomposite particles and the resulting irreversible losses in cell capacity.

Swelling of binders in electrolytes depends not just on the binder composition, but may also depend on the electrolyte compositions. Furthermore, such swelling (and the resulting performance reduction) often correlates with the reduction in elastic modulus upon exposure of binders to electrolytes. In this sense, the smaller the reduction in modulus in certain electrolytes, the more stable the binder-linked (nano)composite active particles/conductive additives interface becomes. The reduction in binder modulus by over 15-20% may result in a noticeable reduction in performance. In an example, the reduction in the binder modulus by two times (2×) may result in a substantial performance reduction. In a further example, the reduction in modulus by five or more times (e.g. 5×-500×) may result in a very significant performance reduction. Therefore, selecting an electrolyte composition that does not induce significant binder swelling may be highly preferential for certain applications. In some examples, it may be preferred to select an electrolyte composition reduces the binder modulus by less than about 30 vol. % (more preferably, by no more than 10 vol. %) when exposed to electrolyte. In anodes which comprise more than one binder composition, it may be preferred to select an electrolyte composition where at least one binder does not reduce the modulus by over 30 vol. % (more preferably, by no more than 10 vol. %) when exposed to electrolyte.

The following electrolyte compositions may be beneficial for use in Li and Li-ion cells with high capacity nanocomposite electrode powders (comprising conversion- or alloying-type active materials) that experience certain volume changes during cycling (moderately high volume changes (e.g., an increase by about 8-about 160 or about 180 vol. % or a reduction by about 8-about 70 vol. %) during the first charge-discharge cycle and moderate volume changes (e.g., about 4-about 50 vol. %) during the subsequent charge-discharge cycles), an average size in the range from around 0.2 to around 40 microns (for some applications, more preferably from around 0.4 to around 20 microns) and specific surface area in the range from about 0.5 $m^2/g$ to about 50 $m^2/g$. These electrolytes may comprise one or more the following components: (a) low-melting point (LMP) solvent or solvent mixture; (b) regular melting point (RMP) solvent or solvent mixture; (c) additive (ADD) solvent or solvent mixture (added, for example, to improve anode electrolyte interphase properties or to improve cathode electrolyte interphase properties or to stabilize Li salts or to provide other useful functionality); (d) main (MN) Li salt or Li salt mixture; (e) additive (ADD) salt or salt mixture (not necessarily Li-based) (added, for example, to improve anode electrolyte interphase properties or to improve cathode electrolyte interphase properties or to stabilize Li salts or to provide other useful functionality); (f) other functional additives (OFADD) (added, for example, to enhance cell safety), where LMP solvent or LMP solvent mixture may preferably contribute to about 10-about 95 vol. % of the volume of all solvents in the electrolyte (more preferably, the LMP solvent or LMP solvent mixture may contribute to about 10-about 80 vol. % of the volume of all solvents in the electrolyte in some designs; e.g., for cells with high-capacity nanostructured anodes, a more favorable volume fraction of LMP solvents may range from about 20 vol. % to about 60 vol. %); where RMP solvent or RMP solvent mixture may preferably contribute to about 5-about 90 vol. % of the volume of all solvents in the electrolyte (more preferably, the RMP solvent or RMP solvent mixture may contribute to about 20-about 90 vol. % of the volume of all solvents in the electrolyte in some designs); and where ADD solvent or solvent mixture may preferably contribute to about 0-about 6 vol. % of the volume of all solvents in the electrolyte. Particular values of the optimum volume fractions of the LMP, RMP and ADD solvents or solvent mixtures for particular applications may depend on the cell operating potentials, cell operating (or cell storage) temperature and rates of charge and discharge desirable for cells in a given application. Examples of suitable esters for use as LMP solvent(s) or co-solvent(s) may include, but are not limited to, various formates (e.g., methyl formate, ethyl formate, propyl formate, butyl formate, amyl formate, hexyl formate, heptyl formate, etc.), various acetates (e.g., methyl acetate, ethyl acetate, propyl acetate, butyl acetate, amyl acetate, hexyl acetate, heptyl acetate, etc.), various propionates (e.g., methyl propionate, ethyl propionate, propyl propionate, butyl propionate, amyl propionate, hexyl propionate, heptyl propionate, etc.), various butyrates (e.g., methyl butyrate, ethyl butyrate, propyl butyrate, butyl butyrate, amyl butyrate, hexyl butyrate, heptyl butyrate, etc.), various valerates (e.g., methyl valerate, ethyl valerate, propyl valerate, butyl valerate, amyl valerate, hexyl valerate, heptyl valerate, etc.), various caproates (e.g., methyl caproate, ethyl caproate, propyl caproate, butyl caproate, amyl caproate, hexyl caproate, heptyl caproate, etc.), various heptanoates (e.g., methyl heptanoate, ethyl heptanoate, propyl heptanoate, butyl heptanoate, amyl heptanoate, hexyl heptanoate, heptyl heptanoate, etc.), various caprylates (e.g., methyl caprylate, ethyl caprylate, propyl caprylate, butyl caprylate, amyl caprylate, hexyl caprylate, heptyl caprylate, etc.), various nonaoates (e.g., methyl nonaoate, ethyl nonaoate, propyl nonaoate, butyl nonaoate, amyl nonaoate, hexyl nonaoate, heptyl nonaoate, etc.), various decanoates (e.g., e.g., methyl decanoate, ethyl decanoate, propyl decanoate, butyl decanoate, amyl decanoate, hexyl decanoate, heptyl decanoate, etc.), and fluorinated versions of the above-discussed esters, to name a few examples. Examples of solvents suitable for use as RMP solvents in the electrolyte (or for the fabrication of RMP solvent mixtures in the electrolyte) may comprise: various carbonates (fluorinated acyclic carbonates and propylene carbonate may be particularly advantageous for use in cells with high voltage cathodes), various sulfones (e.g., dimethyl sulfone, ethylmethyl sulfone, etc.) and various sulfoxides, various lactones, various phosphorous based solvents (e.g., dimethyl methylphosphonate, triphenyl phosphate, etc.), various silicon based solvents, various types of higher melting point esters (e.g., esters with melting points above around minus (−) 50° C.), various ethers (e.g., dioxolane, monoglyme, diglyme, triglyme, tetraglyme, and polyethylene oxide, etc.), various cyclic ester-based molecules (e.g., butyrolactones and valerolactones), various dinitriles (e.g., succinonitrile, adiponitrile, and glutaronitrile), and various ionic liquids (e.g., imidazoliums, pyrrolidiniums, piperidiniums, etc., may be particularly useful in cells comprising high voltage cathodes). RMP solvent(s) may also be (either fully or partially) fluorinated. The most widely used (in Li-ion battery) fluorinated solvent is a fluoroethylene carbonate (FEC). It helps to form a more stable (more cross-linked compared to ethylene carbonate, EC) SEI, but its excessive use (e.g., above around 30 vol. %) may also induce cell performance reduction, particularly at elevated temperatures or/and in cells comprising high voltage cathodes operating at above around 4.2 V vs. Li/Li+. Examples of solvents suitable for use as ADD solvents in the electrolyte (or for the fabrication of ADD solvent mixture in the electrolyte) may include various carbonates (including fluorinated carbonates), various sulfones (including fluorinated ones), various sulfoxides (including fluorinated ones), various lactones (including fluorinated ones), various phosphorous-based solvents (including fluorinated ones), various silicon-based solvents (including fluorinated ones) and various ethers (including fluorinated ones), various nitriles and dinitriles, among others. Nitriles and dinitriles typically suffer from unfavorable SEI formation on the anode, but in small quantities (e.g., typically below 10 vol. %, more typically below 5 vol. %) their applications in the electrolyte mix may improve electrolyte conductivity and cell performance, particularly where high voltage cathodes are utilized. In some cases (e.g., when high (e.g., above 20 vol. %) content of so-called "SEI formers" are utilized in electrolyte), nitriles and dinitriles may also be components of a LMP solvent mixture.

As used herein, LMP refers to a melting point (of a solvent or a solvent mixture) that is generally below a threshold (e.g., below minus (−) 60° C.), and typically in the range, for example, from around minus (−) 120° C. to around minus (−) 60° C. As used herein, RMP refers to a melting point (of a solvent or a solvent mixture) that is generally above a threshold (e.g., above minus (−) 60° C.), and typically in the range from, for example, around minus (−) 60° C. to around plus (+) 30° C. In a further example, LMP may refer to a melting point (of a solvent or a solvent mixture) in a narrower range, such as from around minus (−) 110° C. to around minus (−) 70° C. or from around minus (−) 100° C. to around minus (−) 80° C.

In one or more embodiments of the present disclosure, it may further be advantageous for the LMP solvent(s) (or at least one major component of the LMP solvent mixture) in the electrolyte to exhibit a boiling point in excess of about +50° C. (more preferably, in excess of about +70° C.; and still more preferably, in excess of about +80° C.).

Additional discussion is provided below with respect to cells with the same type of high capacity nanocomposite electrode particles or powders (e.g., with the same type/class of high capacity nanocomposite anode powders in the anode or with the same type/class of high capacity nanocomposite cathode powders) as those described above.

In some designs, various cyclic or linear esters (e.g., γ-valerolactone, γ-methylene-γ-butyrolactone, γ-hexalactone, α-angelica lactone, α-methylene-γ-butyrolactone, ε-caprolactone, 5,6-dihydro-2H-pyran-2-one, γ-butyrolactone, δ-hexalactone, α-methyl-γ-butyrolactone, phthalide, γ-caprolactone, ethyl propionate, propyl acetate, methyl formate, ethyl acetate, propyl propionate, methyl propionate, ethyl propionate, methyl valerate, methyl butyrate, ethyl butyrate, butyl valerate, butyl butyrate, propyl propionate, etc.), (in some designs—without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), various cyclic or linear ethers (e.g., tetrahydrofuran, tetrahydropyran, furan, 4-methylpyran, pyran, 12-crown-4, 15-crown-5, 18-crown-6, 4-methyl-1,3-dioxane, dimethyl ether, methyl t-butyl ether, diethyl ether, methoxyethane, dioxane, dioxolane, monoglyme, diglyme, triglyme, tetraglyme, etc.), (in some designs without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), various anhydrides (e.g., glutaric anhydride, succinic anhydride, maleic anhydride, phthalic anhydride, cyclobutane-1,2,3,4-tetracarboxylic dianhydride, butyric anhydride, isobutyric anhydride, etc.), (in some designs without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), may be advantageously utilized as LMP solvents or co-solvents in the LMP mix.

In some designs, adding different functional groups to selected electrolyte solvents (e.g., to at least some of the solvent(s) in the LMP or LMP mixture(s), such as anhydrides, ethers, esters and others or to at least some of the solvents from the RMP or RMP mixture(s)) may provide various advantages in certain applications. For example, adding electron donating material(s) (such as alkanes, methoxy, amines, etc.) may reduce reduction potential (that is make it harder to reduce), which may be advantageous when such a reduction for a particular solvent needs to be avoided or minimized (e.g., when such solvent(s) are not used to form an SEI, but are added to maintain high ionic conductivity within the electrode pores at cell operating temperatures). In another example, adding electron withdrawing material (s) (such as a fluorine, esters, nitro groups, etc.) may increase the solvent reduction potential (make it easier to reduce), which may be advantageous when such solvent(s) are used as components of a stable SEI formation. In an example, forming such an SEI at elevated potentials (before other electrolyte solvent components are reduced)

may prevent undesirable reduction of other solvents (e.g., solvents that form a less stable SEI or less ionically conductive SEI or SEI with less favorable other characteristics) on the electrode surface. In addition, such solvents may offer higher oxidation potentials (which may be advantageous for maintaining improved stability and reducing leak rates, etc.) if cathodes are exposed to high electrode potentials (e.g., above around 4.4 V vs. Li/Li+).

In the case of electron withdrawing material(s), replacement of selected hydrogen atoms in such solvents or co-solvents by fluorine atoms (e.g., by using various fluorination reactions or other mechanisms) may be particularly advantageous in some designs. Specifically, electrolyte solvents/co-solvents (e.g., components of the LMP and/or RMP electrolyte solvent components) that already work reasonably well in applications (e.g., form a somewhat stable SEI) may additionally benefit (e.g., show increased cycle stability or other benefits) from at least partial fluorination, particularly if high-capacity nanostructured anodes (e.g., Si comprising anodes) are utilized in cell construction. Such a reaction may increase SEI formation potential and enhance electrochemical stability of electrodes (e.g., via enhanced stability of the protective anode SET or cathode SET layer) during cycling. Suitable examples include various fluorinated esters, various fluorinated ethers, various fluorinated anhydrides in the case of LMP components and various other fluorinated solvents (including carbonates, nitriles, sulfones, larger esters, etc.) in the case of RMP components. It will be appreciated that the optimum fluorination or content of the fluorinated solvent may vary from application to application. For example, excessive fluorination or using too much of the fluorinated solvents may be undesirable in some applications (e.g., if the battery cathode may be exposed to high temperatures (e.g., above around 40° C.) and high operating potentials (e.g., above around 4.4 V vs. Li/Li+)). In addition, excessive fluorination or using too much of the fluorinated solvents may reduce electrolyte wetting of some of the separators or electrodes and thus reduce capacity utilization and rate performance, particularly at lower temperature. The optimum content of the fluorinated solvent may depend on cell operation, as well as electrode and separator surface chemistry and properties.

In some designs, the use of solvents (co-solvents) (e.g., as components of the LMP or RMP electrolyte solvent components) that exhibit double bond(s) in their structure (e.g., one, less than one or more than one double bonds per solvent molecule) or other opportunities to form a polymer upon chemical or electrochemical reaction(s) may be advantageous for the formation of more stable SEI (e.g., via alkene polymerization). Solvent molecules that contain both a double bond and a fluorine may be particularly attractive for forming an SEI with favorable characteristics (e.g., improved stability, etc.). Similarly, solvents (co-solvents) that may undergo ring opening polymerizations (e.g., in solvents with a ring structure that contains an alkene or a variety of heteroatoms, such as propane sulfone) may also be advantageously utilized as electrolyte components due to their ability to form a more stable SEI in some designs.

Polarity of a solvent (co-solvent) (which is affected by functional groups) may have a significant impact on electrolyte properties. For example, more polar solvents may provide higher solubility to electrolyte salts and thus may contribute to improved ionic conductivity. At the same time, more polar solvents are typically harder (more expensive) to dry (remove water residues). In addition, many polar solvents (such as amines and alcohols, etc.) may also be sources of protons, which may induce undesirable side reactions (e.g., hydrogen evolution, etc.).

In some designs, it may be beneficial to have a mixture of solvents in the electrolyte, one or more of which exhibit a broad electrochemical stability window and one or more others of which exhibit a narrower electrochemical stability window (at least in combination with the electrolyte salt). In some designs, it may be beneficial for the difference in the electrochemical stability window of at least some of the electrolyte solvents to exceed about 1V. In some designs, it may be advantageous for at least one component of the LMP solvent mix to exhibit a higher electrochemical stability window than at least one component of the RMP solvent mix (at least when used with the same electrolyte salt).

Figure 2:
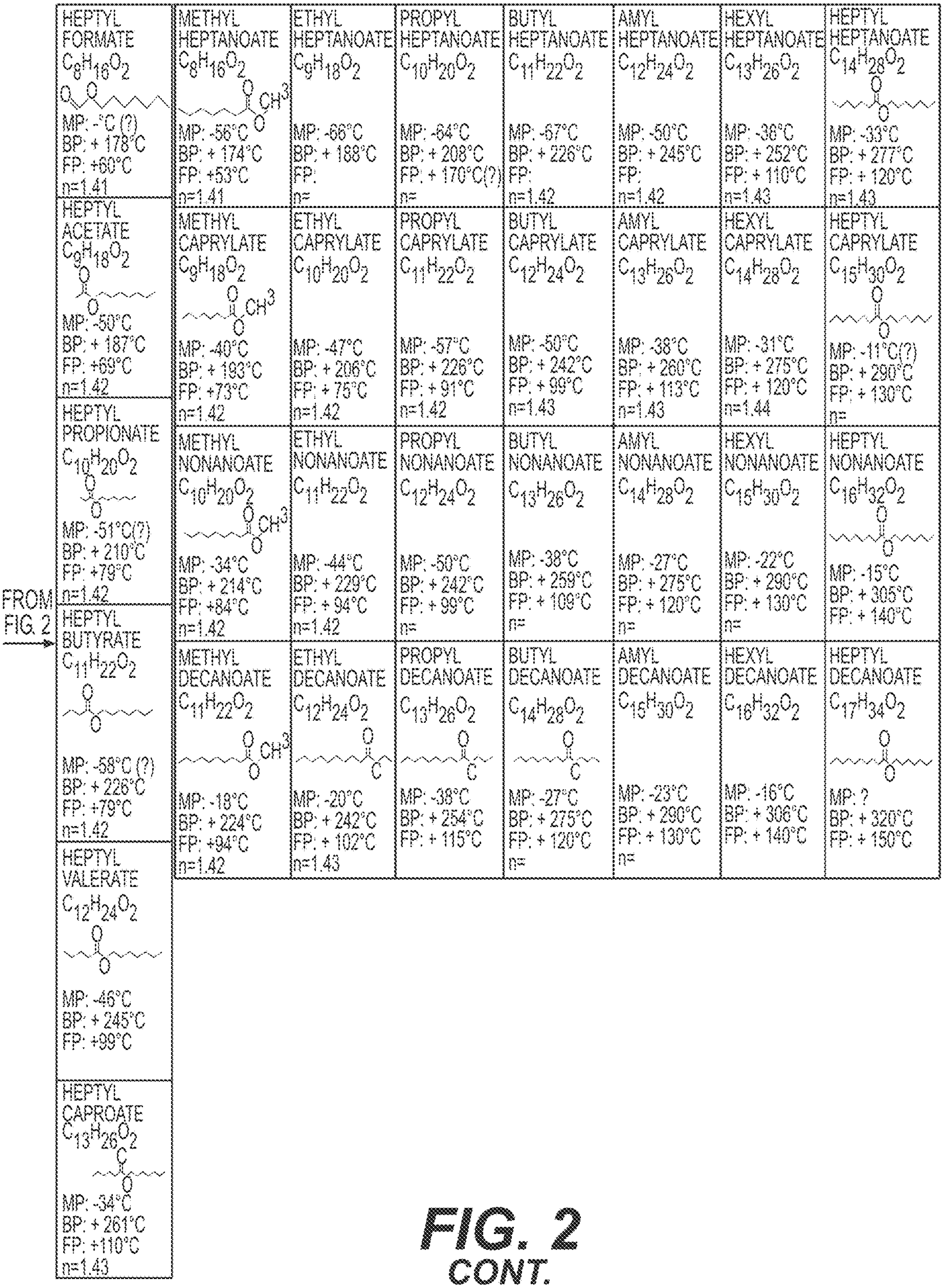
FIG. 2 illustrates selected examples of suitable electrolyte components.

FIG. 2 shows selected examples of linear ester solvents (without additional functional groups) with their melting points and other characteristics (such as boiling point, flash point, refractive index) that may be used effectively as LMP (or RMP) components of suitable electrolyte compositions in accordance with embodiments of the disclosure.

Figure 3A:
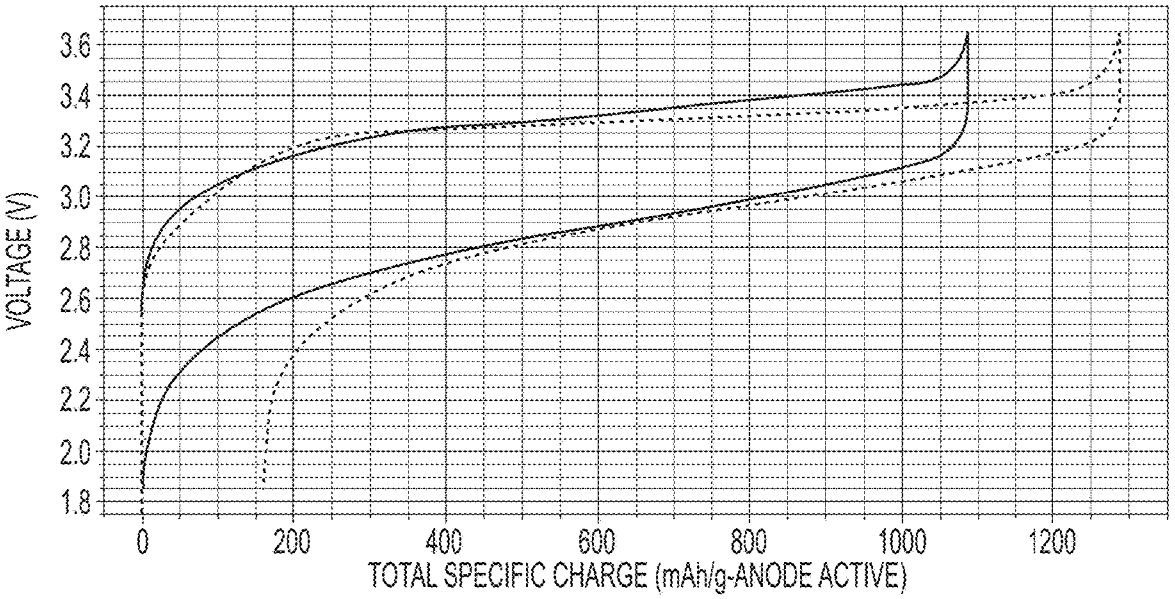
FIGS. 3A-3B, 4A-4B, 5, 6, and 7A-7C illustrate impacts of example electrolyte compositions on the performance characteristics of full cells with (nano)composite anodes exhibiting high capacity and moderately high volume changes during the first charge-discharge cycle and moderate volume changes during the subsequent charge-discharge cycles.
Figure 3B:
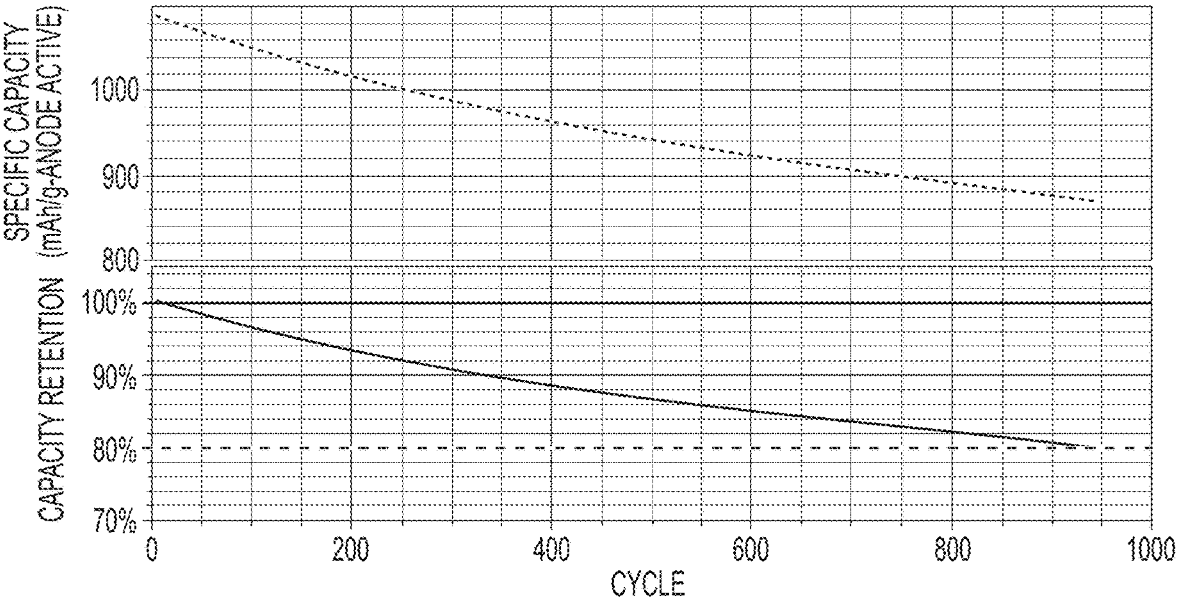

FIGS. 3A and 3B show an illustrative example of selected performance characteristics of a matched full cell comprising an intercalation-type lithium iron phosphate (LFP) powder cathode and a high capacity nanocomposite Si-comprising powder anode. The cell was cycled in the potential range from 1.85 to 3.65 V. The nanocomposite anode exhibited moderately-high volume changes during the first charge-discharge cycle and moderate volume changes during the subsequent charge-discharge cycles. The individual anode particles exhibited an average particle size of about 3 microns and specific surface area of about 5 $m^2/g$. The anode coating comprised 92 wt. % of the nanocomposite anode powder and 8 wt. % of inactive components (binder and conductive additives). The cell electrolyte comprised 2 vol. % vinylene carbonate (VC) (as an ADD electrolyte component), 40 vol. % of a mixture of cyclic and linear carbonates (20 vol. % each) (as the RMP component of the electrolyte) and very high content (as high as 58 vol. %) of methyl butyrate (MB) (as a linear ester and the LMP component of the electrolyte; methyl butyrate exhibits a very low melting point of about −95° C.). The cycle stability is illustrated by the specific capacity of the anode active material. FIG. 3A shows typical charge-discharge curves for cycle 1 (higher charge capacity curve) and for cycle 5 (lower charge capacity curve due to irreversible first cycle losses). This example cell exhibited a first charge-discharge cycle efficiency of 88%. FIG. 3B shows electrochemical stability of the example cell, where specific capacity is normalized by the weight of the active anode material (92 wt. % of the weight of the anode coating). The cell was cycled at room temperature at the 0.5 C rate and showed cycle life of about 940 cycles (to 80% of the cycle 5 capacity).

In some designs, it may be advantageous to have a total salt concentration in the electrolyte in the range from about 0.8M to about 2.0M, while utilizing a mixture of two or more salts. Lower than about 0.8M salt concentration in the electrolyte may lead to reduced cell stability (e.g., when high capacity anode materials are used), particularly when high areal capacity electrodes are used (e.g., above around 4mAh/$cm^2$). Higher salt concentration in the electrolyte may lead to reduced rate performance and, in some designs, to reduced cell stability. Such reduced performance characteristics may be related to reduced mobility of $Li^+$ cations in the electrolyte. Higher salt concentration may also lead to increased electrolyte density and cost, which may be undesirable for some applications. The optimal salt concentration may depend on the particular cell design and electrolyte composition. Interestingly, some cells (e.g., those that comprise $Li_2S$ or $Li_2Se$ or S or Se based conversion-type cathodes or Li metal anodes, among others) may sometimes (e.g., in cases when fast charging is not required) benefit from reduced electrolyte molarity (e.g., below about 0.2 M).

In some cases, combinations of salts may exhibit enhanced $Li^+$ mobility than individual salts of the same concentration. In some designs, such salts may be selected so that the Li salts (or their solvated counterparts) form a eutectic system (with a reduced melting point). In one example, several Li imide salts (e.g., a mixture of $SO_2FN^-(Li^+)SO_2F$ and a $CF_3SO_2N^-(Li^+)SO_2CF_3$ salts or a mixture of $CF_3SO_2N^-(Li^+)SO_2CF_3$ and $CF_3CF_2SO_2N^-(Li^+)SO_2CF_3$ or a mixture of $CF_3SO_2N^-(Li^+)SO_2CF_3$ and $CF_3CF_2SO_2N^-(Li^+)SO_2CF_2CF_3$, etc.) may form such a system. In some designs, such salts and their relative fractions may be selected to induce freezing point depression. In some designs, the most favorable relative fractions of the salts may be selected to minimize the freezing point (via such a freezing point depression). In some designs, other Li and non-Li salts may be added in small quantities (e.g., from around 0.001M to around 0.500M) to further depress the electrolyte melting point, improve SEI properties and reduce dissolution of active materials or their components. In some designs, the non-Li salts may be salts of Mg, K, Ca or Na. In some designs, the non-Li salts may be salts of rare earth metals (e.g., La).

In some designs utilizing two or more salts (e.g., three salts or four salts or five salts, etc.), it may be advantageous for at least one of the salts to comprise $LiPF_6$ (in the case of rechargeable Li or Li-ion batteries). In some designs, it may be further advantageous for one other salt to also be a salt of Li. It may be further advantageous for at least one other (non-$LiPF_6$) salt to be electrochemically unstable in the electrolyte (e.g., decompose on the anode) upon reduction of the anode potential to below about 0.3-2.3 V vs. Li/Li+. In some designs, it may be advantageous for the salt decomposition to take place at above about 0.3 V vs. Li/Li+, more preferably above about 1V vs. Li/Li+(and in some designs, more preferably above about 1.5V vs. Li/Li+). It may be further advantageous for the non-$LiPF_6$ salt in the electrolyte to induce or catalyze electrolyte reduction at above about 0.3 V vs. Li/Li+, more preferably above about 1V vs. Li/Li+(and in some designs, more preferably above about 1.5V vs. Li/Li+ or even above about 2.0 V vs. Li/Li+). It may be further advantageous for the (e.g., partially decomposed) non-$LiPF_6$ salt in the electrolyte to react with at least some of the solvent molecules in the electrolyte to form oligomers. In some designs, a non-$LiPF_6$ salt may be LiFSI salt. Furthermore, in the case of the electrolyte comprising both $LiPF_6$ salt and LiFSI salt, the ratio of the molar fractions of $LiPF_6$ and LiFSI salts may preferably be in the range from around 100:1 to around 1:1. The exact optimal ratio may depend on the electrode characteristics (e.g., thickness, amount of binder, density, anode and cathode composition and capacity, etc.), electrolyte solvent mix utilized and cycling regime (temperature, cell voltage range, etc.). It may further be advantageous for the electrolyte solvent to comprise a mixture of LMP and RMP solvents and (optionally) ADD and other co-solvents. In some designs, it may also be advantageous for the LMP solvent or solvent mix to comprise ester(s).

In some designs, it may be advantageous to have a total salt concentration in the electrolyte in the range from around 0.8M to around 2.0M, while utilizing a small fraction of at least one at least partially fluorinated solvent in the electrolyte mixture in the range from around 1 to around 30 vol. %, as a fraction of all the solvents in the electrolyte. It may be further advantageous for the electrolyte solvent mixture to comprise both linear and cyclic molecules. It may be advantageous for at least one of the cyclic molecules to comprise fluorine atoms. In some designs, it may be preferred for the electrolyte to comprise a fluoroethylene carbonate (FEC) co-solvent in electrolyte (e.g., in the range from around 1 to around 30 vol. %, as a fraction of all the solvents in the electrolyte). In an example, the optimal amount of FEC may depend on the surface area of the nanostructured anode particles. For nanostructured anode particles with lower surface area (e.g., below about 15 $m^2/g$), FEC content may not significantly affect formation efficiency. However, for particles exhibiting higher surface area (e.g., above about 15 $m^2/g$), higher FEC content may allow for improved formation efficiency. The lower surface area and smaller volume changes may also require a smaller FEC fraction for stable operation. Higher FEC content (e.g., above 20-30 vol. %) may reduce cell performance at elevated temperatures (e.g., above about 35° C.), particularly if the cathode of the cell is exposed to high potentials (e.g., above around 4.3-4.4 V vs. Li/Li+). It may further be advantageous for the electrolyte solvent to comprise a mixture of LMP and RMP solvents and (optionally) ADD solvents. In some designs, it may also be advantageous for the LMP solvent or solvent mix to comprise ester(s). In some designs, it may also be advantageous for the electrolyte to comprise other cyclic carbonates in addition to FEC (or other fluorinated cyclic carbonates). In some designs, it may be advantageous for the other cyclic carbonates to comprise ethylene carbonate (EC) with the melting point of about +34-37° C. or another cyclic carbonate with a high melting point (e.g., above about +25° C.). Furthermore, the vol. ratio of FEC (or other fluorinated cyclic carbonates) to other cyclic carbonates may preferably be in the range from about 9:1 to about 1:50. The exact optimal ratio may depend on the electrode characteristics (e.g., thickness, amount of binder, density, anode and cathode composition and capacity, etc.), electrolyte solvent mix utilized and cell cycling regime (temperature, voltage range, etc.).

Figure 4A:
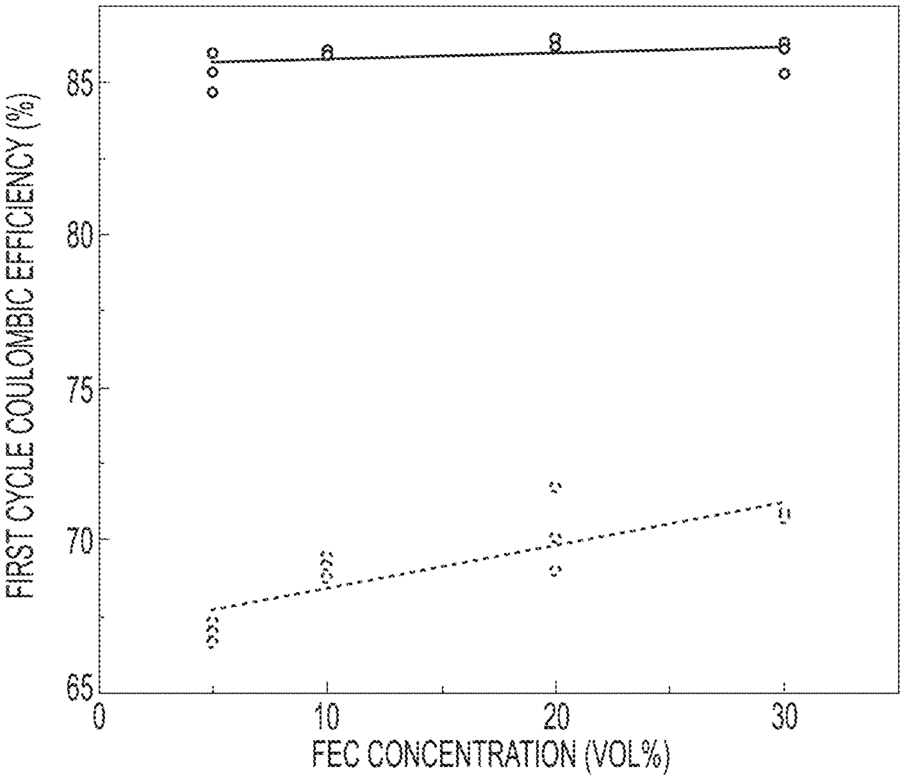
Figure 4B:
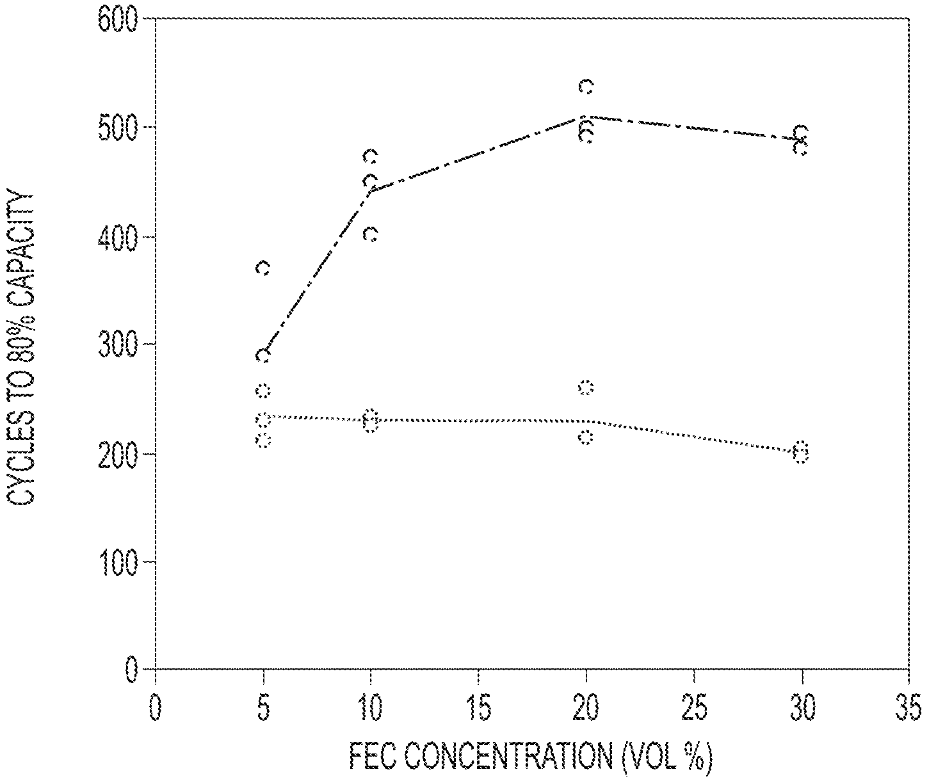

FIGS. 4A-4B illustrate the impact of some example electrolyte compositions on the performance of cells comprising a powder-based high capacity, Si-comprising nanocomposite anode and powder-based intercalation-type cathode (lithium cobalt oxide, LCO, in this example) and cycled in the voltage range from 2.5 to 4.4 V. Cycle stability was studied in several example cells cycled at a "C/2" rate. Two-to-three (2-3) near-identical cells were constructed and tested for consistency. In these examples, all electrolytes comprise the same salt ($LiPF_6$) in the amount of 1.2M, an ester selected from FIG. 2 (with melting point below −90° C.) in the amount of 58 vol. % (as a fraction of the total solvent volume), the same amount of the same ADD cyclic carbonate solvent in the amount of 2 vol. %, the same amount of the same linear carbonate in the amount of 20 vol. % and variable amounts of FEC (in the range from 0 to 30 vol. %) and variable amounts of another cyclic carbonate (EC) (in the range from 0 to 30 vol. %) to keep the total amount of cyclic carbonates constant at 30 vol. %. FIG. 4A illustrates that higher surface area nanostructured Si anodes show lower first charge-discharge cycle efficiency (e.g., data points corresponding to the lower curve in FIG. 4A) and stronger dependence of the efficiency on FEC fraction. Lower surface area nanostructured Si anode show higher first cycle efficiency (e.g., data points corresponding to the higher curve in FIG. 4A) and weaker dependence of the efficiency on FEC fraction. FIG. 4B shows performance of Li-ion cells with Si-comprising anodes at room temperature and at 45° C. and illustrates that (in this example) FEC content less than about 20 vol. % reduces cell cycle stability at room temperature (e.g., data points corresponding to the upper curve in FIG. 4B), while FEC content of more than about 20 vol. % slightly reduces stability at 45° C. (e.g., data points corresponding to the lower curve in FIG. 4B) for the nearly identical cells with nearly identical Si-comprising anodes.

In some designs where areal electrode capacity is higher than about 4 mAh/cm$^2$, it may be advantageous to have a total Li salt concentration in the electrolyte in excess of around 1M (preferably in excess of about 1.1M, in some designs about 1.2M, and below about 2.4M; in some designs—below about 1.8 M), while utilizing a small fraction of at least one at least partially fluorinated solvent in the electrolyte mixture in the range from about 1 vol. % to about 30 vol. %, as a fraction of all the solvents in the electrolyte. At such high capacity loadings Li salt concentration of 1-1.1M or below may lead to faster degradation in some designs, particularly when high capacity Si-comprising composite anodes are used.

Figure 5:
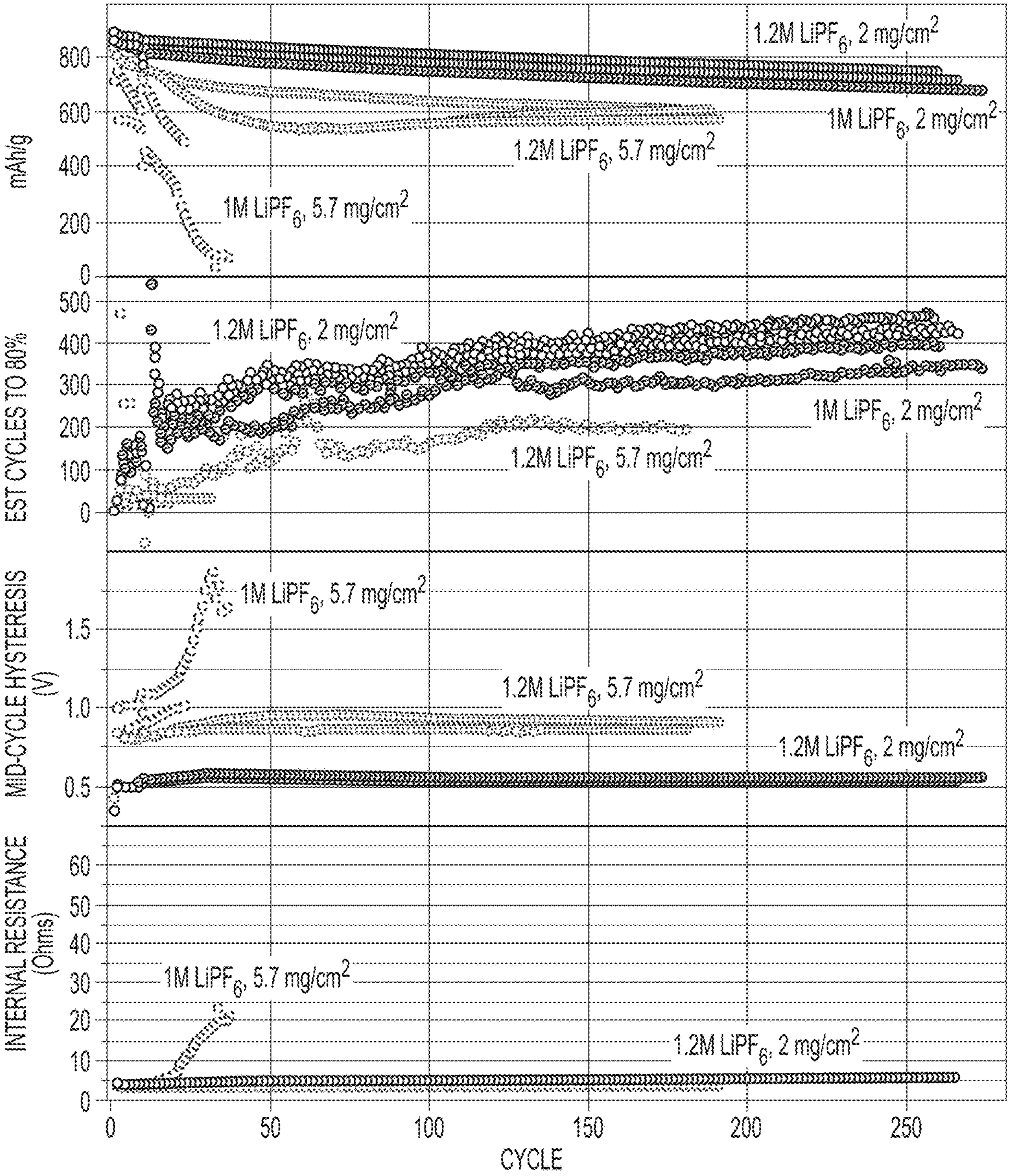

FIG. 5 illustrates the impact of salt concentration on the performance of low electrode capacity loading and high electrode capacity loading cells comprising a powder-based high capacity, Si-comprising nanocomposite anode and powder-based intercalation-type cathode (lithium cobalt oxide, LCO, in this example) and cycled in the voltage range from 2.5 to 4.4 V. Cycle stability was studied in several example cells cycled at a "C/2" rate. Two near-identical cells were constructed and tested for consistency. In these examples, all electrolytes comprise an $LiPF_6$ salt in the amount of either 1M or 1.2M, 20 vol. % FEC, 78 vol. % DEC and 2 vol. % VC. As evidenced by the results depicted in FIG. 5, poor cycle stability of the cell with a high capacity loading (high mass loading of 5.7 mg/cm$^2$ in this example) anode may be significantly improved if $LiPF_6$ salt concentration is increased from 1M to 1.2M. At lower mass (capacity) loadings (2 mg/cm$^2$ in this example), the positive impact of higher salt concentration is significantly smaller (e.g., in FIG. 5, compare curves for 1.2M $LiPF_6$ 2 mg/cm$^2$ to 1.2M $LiPF_6$ 5.7 mg/cm$^2$).

In some designs, it may be advantageous to have a total salt concentration in the electrolyte in the range from around 0.8M to around 2.0M, while utilizing a small fraction of fluorine-containing cyclic carbonate(s) (e.g., fluoroethylene carbonate (FEC)) as co-solvent(s) in electrolyte (e.g., in the range from around 1 to about 30 vol. %, as a fraction of all the solvents in the electrolyte), other (e.g., fluorine-free) cyclic carbonates with a melting point in the range from around minus (−) 10° C. to around minus (−) 60° C. and linear (e.g., fluorine-containing or fluorine-free) carbonates. It may be advantageous for the carbonates (e.g., cyclic carbonates) to comprise double-bonded oxygen (═O, carbonyl group) in their molecular structure. It may be also advantageous for the carbonates (e.g., cyclic carbonates) to comprise at least one methyl side group (—$CH_3$) in their structure. In some designs, it may also be advantageous for a propylene carbonate (PC) having a melting point of about minus (−) 49° C. to be at least one of the cyclic carbonates in the electrolyte mix. The amount of PC may preferably be in the range from about 0 to about 50 vol. %. In some designs, an amount of PC in the range from around 25 vol. % to around 50 vol. % may be advantageous. This is in contrast to conventional graphite anode comprising cells, which typically show significantly reduced stability when PC amount exceeds 5-20 vol. %. It may also be advantageous for the electrolyte to comprise a mixture of 2-5 cyclic carbonates with different melting points in addition to FEC or in addition to FEC and PC mixture. It may further be advantageous for the electrolyte solvent to comprise a mixture of LMP and RMP solvents and (optionally) ADD solvents. In some designs, it may also be advantageous for the LMP solvent or solvent mix to comprise ester(s). In some designs, it may be advantageous for the ADD solvents to comprise a small amount (e.g., about 0.1-about 5 vol. %) of vinylene carbonate (VC) or vinyl ethylene carbonate (VEC) cyclic carbonates (in some designs, the use of VC may be preferred). It may be further advantageous for the total amount of all cyclic solvents in the electrolyte mixture to be in the range from about 10 to about 60 vol. %. It may be further advantageous for the total amount of cyclic carbonates in the electrolyte mixture to be in the range from about 10 to about 50 vol. %. Higher amount of cyclic solvents is commonly detrimental to capacity retention at high cycling C-rates or performance at low temperatures and, in some case, even to the cycle stability.

In some designs, it may be advantageous to have a total salt concentration in the electrolyte in the range from around 0.8M to around 2.0M, while utilizing a small fraction of fluoroethylene carbonate (FEC) co-solvent in electrolyte (e.g., in the range from around 1 to about 30 vol. %, as a fraction of all the solvents in the electrolyte), some amount of non-FEC cyclic carbonates (e.g., in the range from around 5 to about 30 vol. %, as a fraction of all the solvents in the electrolyte) and some amount of the LMP co-solvent(s) (e.g., in the range from around 20 to about 70 vol. %, as a volume fraction of all the solvents in the electrolyte). In some designs, it may be advantageous to for the electrolyte composition to additionally comprise at least one linear solvent (e.g., as a component of LMP or RMP solvents or solvent mixtures). In some designs, it may be advantageous to for the electrolyte composition to comprise at least one linear carbonate (e.g., as a component of the RMP solvent mixture). In some designs, it may be advantageous for the electrolyte to comprise a mixture of two or more linear carbonates. In some designs, it may be advantageous for the fraction of linear carbonate(s) to constitute from about 5 vol. % to about 60 vol. % (as a volume fraction of all the solvents in the electrolyte). In some designs, it may be even more advantageous for the total fraction of all linear carbonate(s) to constitute from about 10 vol. % to about 30 vol. % (as a volume fraction of all the solvents in the electrolyte). In some designs, it may be preferable for at least one of the linear carbonates or the only linear carbonate or the mixture of all linear carbonates in the electrolyte to exhibit a melting point from around −10° C. to around −60° C. In an example, the size of the linear carbonate molecules may play a significant role in cell performance. For example, shorter chain linear carbonates in the electrolyte may result in better rate performance and, in some cases, better cycle stability. However, too short linear carbonates may also lead to cycle stability reduction. In some designs, the average number of atoms in the linear carbonates in the electrolyte may preferably be in the range from about 12 to about 26 per carbonate molecule. In some designs, it may be advantageous for the electrolyte to comprise diethyl carbonate (DEC) as a linear carbonate or a component of a linear carbonate mixture. DEC-comprising electrolytes may exhibit better rate performance (e.g., better capacity retention at higher rates). Additionally, electrolytes comprising DEC may offer high cycle stability in certain applications.

Figure 6:
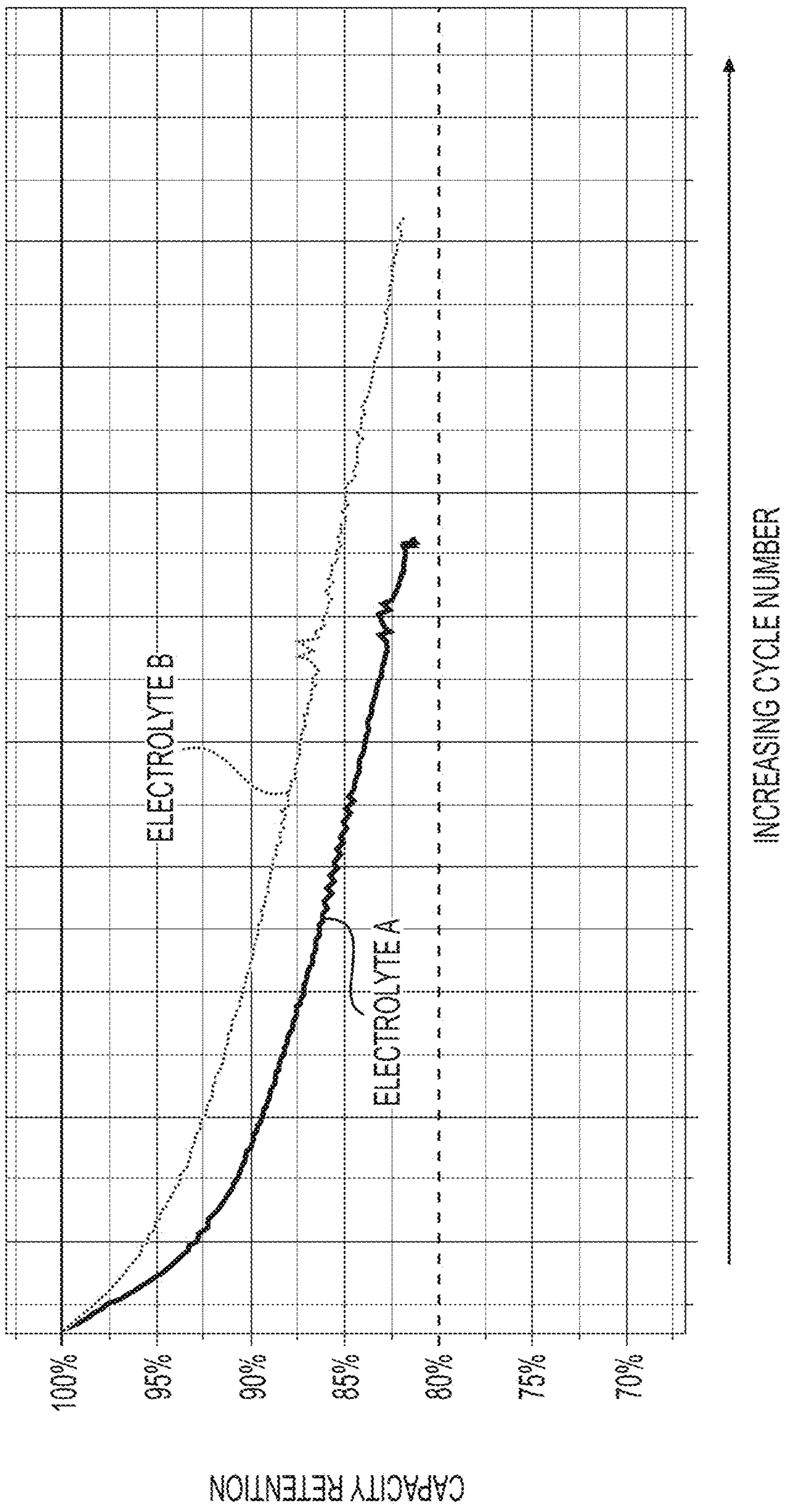

FIG. 6 illustrates the impact of example electrolyte compositions on the performance of cells comprising a powder-based high capacity, Si-comprising nanocomposite anode and powder-based intercalation-type cathode (lithium cobalt oxide, LCO, in this example) and cycled in the voltage range from 2.5 to 4.4 V. Cycle stability was studied in several example cells cycled at a "C/2" rate at 45° C. Two-to-three (2-3) near-identical cells were constructed and tested for consistency for each electrolyte composition. Electrolyte B (upper curve in FIG. 6) comprises 1M $LiPF_6$, 0.2M LiFSI, 20 vol. % PC, 10 vol. % FEC, 20 vol. % a linear carbonate (DEC in this example), 2 vol. % VC and 48 vol. % of linear ester (MB). Electrolyte A (lower curve in FIG. 6) comprises 1.2M $LiPF_6$, no LiFSI, 20 vol. % FEC and the same linear ester (MB) and shows reduced cycle stability.

In some designs, it may be advantageous for the LMP solvents in the suitable electrolyte compositions to exhibit a certain molecular size for optimal performance. The optimal size or size distribution of the LMP molecules may depend on the electrode characteristics (e.g., thickness, amount of binder, density, anode and cathode composition and capacity, etc.), electrolyte solvent mix utilized and cell cycling regime (temperature, voltage range, etc.). In an example, an average LMP molecule (e.g., in a LMP solvent mix, if more than one LMP solvent is utilized or in a single-solvent LMP composition) may preferably comprise from around 9 atoms to around 30 atoms per solvent molecule. In some designs, it may also be advantageous that an average LMP molecule (e.g., in LMP solvent mix or in a single-solvent LMP composition) comprises from around 3 to around 10 carbon atoms in its molecular structure. Smaller LMP molecules (particularly smaller linear molecules) may result in reduced cell cycle stability. Larger LMP molecules (particularly larger linear molecules) may result in undesirably reduced rate performance of cells. If linear esters are used as components of LMP solvent(s), it may be advantageous for such esters to comprise from about 3 to about 9 carbon atoms per molecule, on average. If LMP solvent(s) comprise esters with side branches (additional functional groups), it may be advantageous for such esters to comprise from about 4 to about 12 carbon atoms per molecule, on average. In some designs, the average ester molecules (in LMP co-solvents) with 4-to-7 carbon atoms per molecule (on average) may provide the most stable performance in cells. In some designs, the average ester molecules (in LMP co-solvents) with 5-to-6 carbon atoms per molecule (on average) (in some designs with 5 carbon atoms per molecule) may provide the most stable performance in cells. In some designs, it may be advantageous for about 50 vol. % or more of the LMP solvents to comprise ester molecules with 5 carbon atoms per molecule (on average).

Figure 7A:
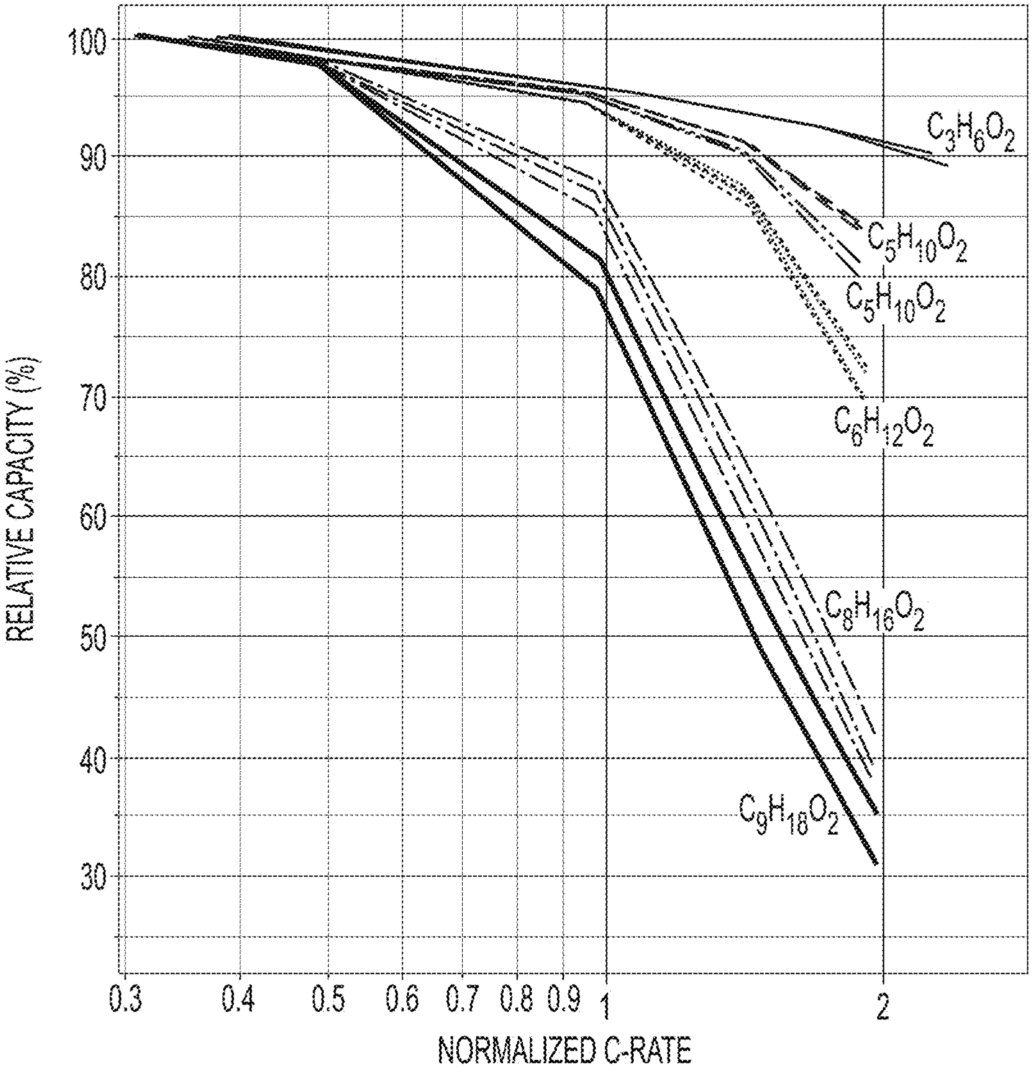
Figure 7B:
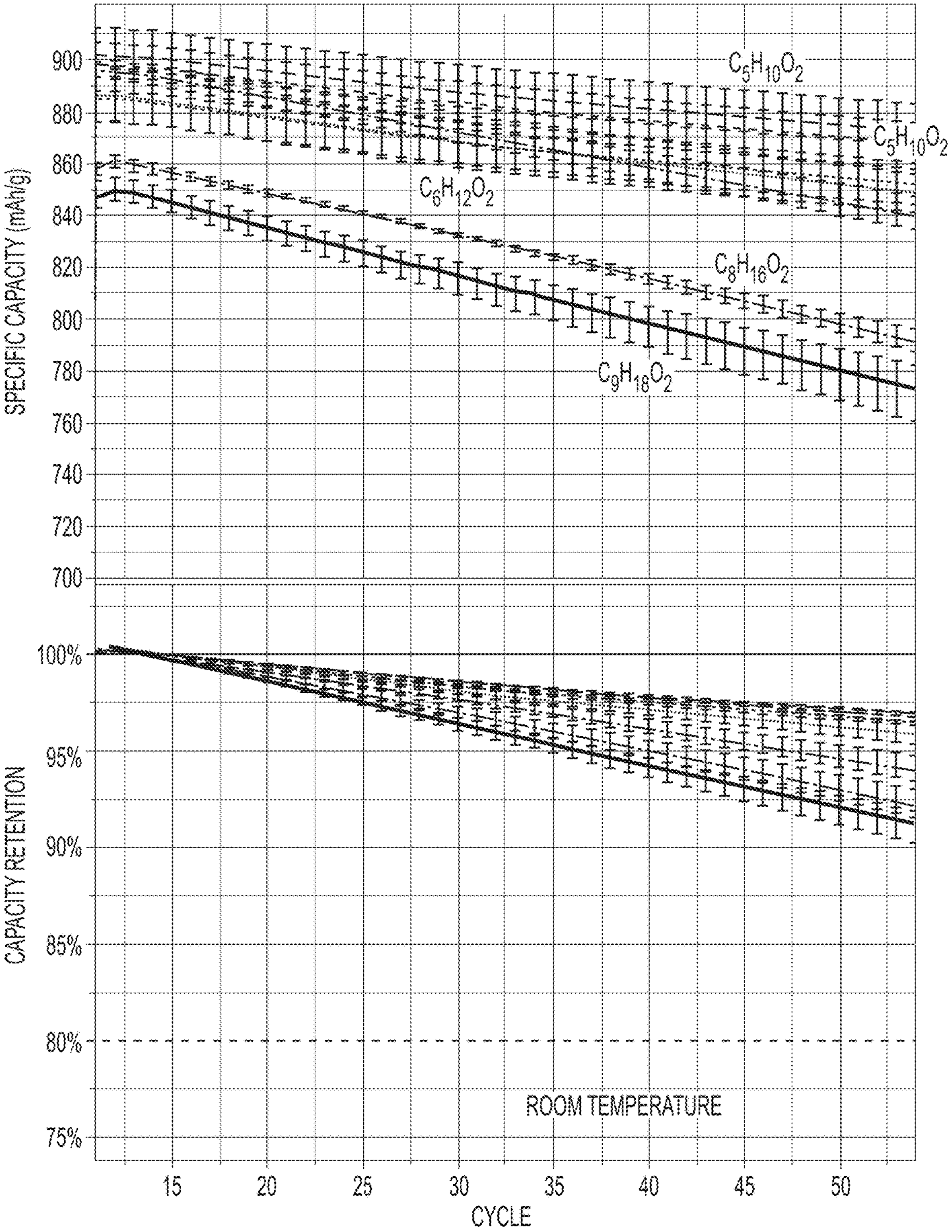
Figure 7C:
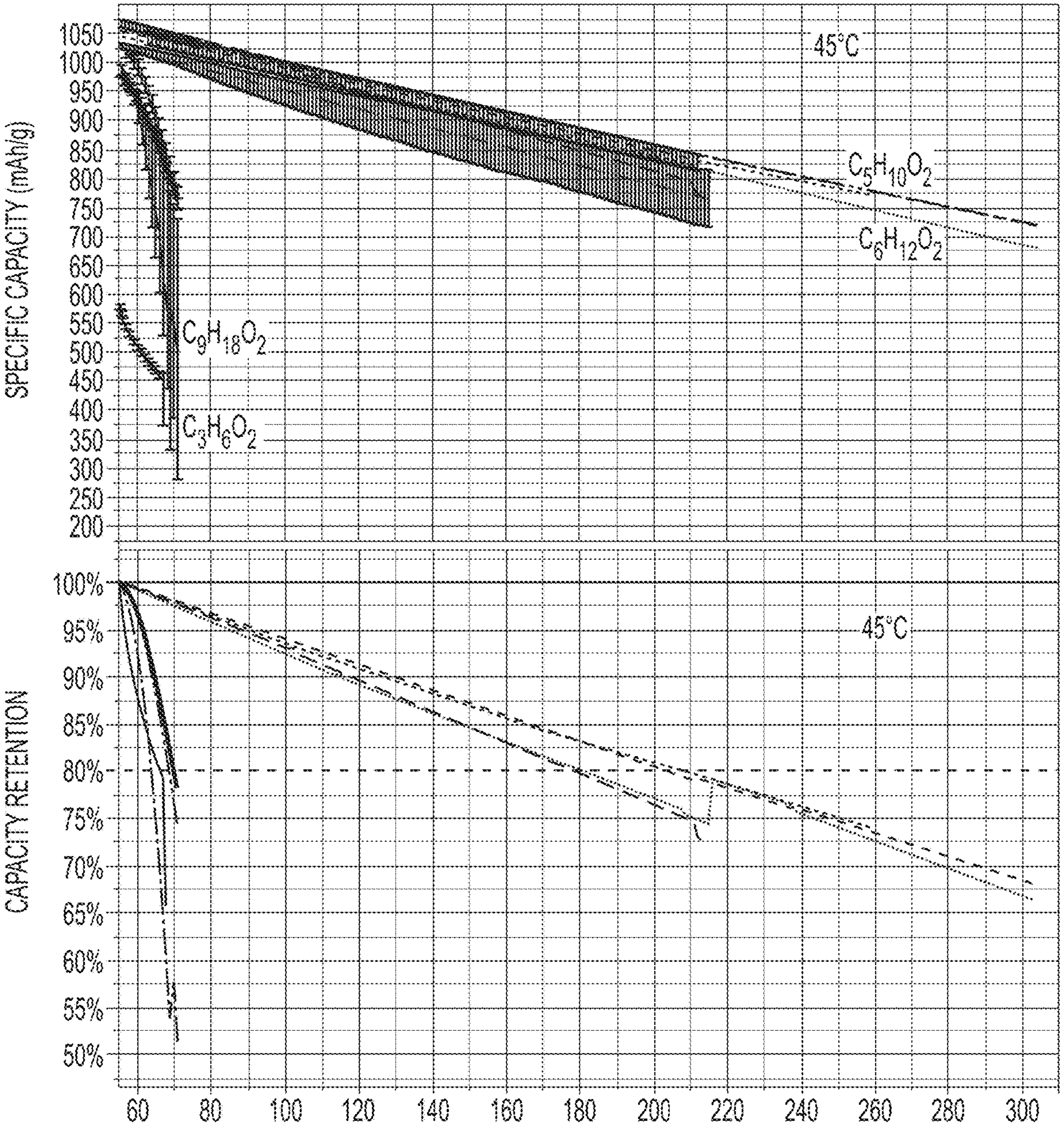

FIGS. 7A-7C illustrate the impact of other example electrolyte compositions on the performance of cells comprising a powder-based high capacity, Si-comprising nanocomposite anode and powder-based intercalation-type cathode (lithium cobalt oxide, LCO, in this example) and cycled in the voltage range from 2.5 to 4.4 V. Cycle stability was studied in several example cells cycled at "C/2" rate at room temperature and at 45° C. Two-to-three (2-3) near-identical cells were constructed and tested for consistency. In these examples, all electrolytes comprise 1.2M $LiPF_6$, 20 vol. % FEC, 20 vol. % of a linear carbonate, 2 vol. % cyclic carbonate (VC in this example) as an ADD solvent, and 48 vol. % linear esters. Esters of different molecular sizes (and molecular weights) were selected for each electrolyte, as indicated in each figure. Only one type of ester (not a mixture of esters) was used in each electrolyte composition in this illustrative example. The rate performance of cells with this series of electrolytes was strongly correlated with the carbon chain length of the ester. The cell based on the electrolyte with the shortest carbon chain length in the ester displays the best capacity retention at higher rates, whereas the cell with the electrolyte with the longest carbon chain length in the ester displays the lowest capacity retention. In this example, esters with 6 or more carbon atoms in the molecule showed undesirably reduced performance. Electrolytes comprising esters with 5-6 carbon atoms per molecule showed the best cycle stability at room temperature. Electrolytes comprising esters with 3 carbon atoms per molecule showed very rapid degradation at room temperature and at 45° C. Electrolytes comprising esters with 8-9 carbon atoms per molecule showed noticeably faster degradation at room temperature and much faster degradation at 45° C.

In some designs where ester(s) are used as co-solvent(s) in the suitable electrolyte mixture (e.g., for some cells with high-capacity nanostructured anodes and with high-voltage intercalation cathodes), it may be advantageous for the total fraction of esters in electrolyte solvent to range from about 20 vol. % to about 70 vol. % (in some designs comprising only linear esters, from about 30 vol. % to about 60 vol. %) as a total vol. fraction of all the solvents in the electrolyte. Both lower and higher ester fractions may lead to noticeably reduced cycle stability, particularly at elevated temperatures.

In some designs, it may be advantageous (for improved cell performance) to use a combination of two, three or more esters of the same chemical formula, but different molecular structure in the electrolyte solvent mix. For example, combine methyl butyrate ($C_5H_{10}O_2$) with ethyl propionate ($C_5H_{10}O_2$) or with propyl acetate ($C_5H_{10}O_2$) or with butyl formate ($C_5H_{10}O_2$) or use their various mixtures (or combinations). Or, in another example, use a combination of two, three or more of the following esters: methyl valerate ($C_6H_{12}O_2$), ethyl butyrate ($C_6H_{12}O_2$), propyl propionate ($C_6H_{12}O_2$), butyl acetate ($C_6H_{12}O_2$) and amyl formate ($C_6H_{12}O_2$). Or, in yet another example, use a combination of two, three or more of the following esters: methyl caproate ($C_7H_{14}O_2$), ethyl valerate ($C_7H_{14}O_2$), propyl butyrate ($C_7H_{14}O_2$), butyl propionate ($C_7H_{14}O_2$), amyl acetate ($C_7H_{14}O_2$), hexyl formate ($C_7H_{14}O_2$).

In some designs, it may be advantageous (for improved cell performance—e.g., improved rate or improved stability, etc.) to use a combination of two, three or more esters (and in some design—combinations of ethers or anhydrides) with a similar chemical formula, e.g., where the number of carbon atoms differs by no more than 3 (e.g., to use a combination of esters with chemical formulas of $C_5H_{10}O_2$, $C_6H_{12}O_2$ and $C_7H_{14}O_2$) in the electrolyte. In some designs, it may be advantageous if such a combination of esters (or ethers or anhydrides) exhibits a lower melting point than each of the individual solvents (e.g., individual esters or individual ethers or individual anhydrides).

In some designs, it may be advantageous (for improved cell performance) to use a combination of esters (and in some design—combinations of ethers or combination of anhydrides) with and without functional groups in the electrolyte. In some designs, it may be advantageous for the linear (or cyclic) part of such esters (or ethers) to be the same or similar so that the presence of (e.g., different) functional groups sets these esters (or ethers) apart.

In some designs when a combination of linear and cyclic esters (and in some designs combinations of esters and ethers) is used and when they have functional groups, it may be advantageous (for improved cell performance) for at least some of the esters or ethers to remain unfunctionalized.

In some designs, it may be advantageous (for improved cell performance) to use a combination of linear and cyclic esters in the electrolyte.

In some designs, when a combination of linear and cyclic esters is used and when at least some of them have functional groups, it may be advantageous (for improved cell performance) for at least some of the linear and cyclic esters to have the same functional group.

In some designs (when a mixture of various esters is used), it may be advantageous for the linear esters in the electrolyte mix to exhibit either the same chemical tail (the same R group) or belong to the same sub-class.

In some designs, it may be advantageous (for improved cell performance) to use a combination of ethers and esters in the electrolyte. In some designs, it may be advantageous for the number of carbon atoms in the ester molecules not to exceed the number of carbon atoms in the ether molecules by more than five (e.g., have 2 or 3 carbon atoms in ether molecules and have 5 or 6 or 7 carbon atoms in ester molecules).

In some designs, it may be advantageous (for improved cell performance) to use a combination of esters, ethers and anhydrides (e.g., with and or without functional groups) in the electrolyte.

In some designs, when a combination of esters, ethers and anhydrides is used, it may be advantageous for the linear (or cyclic) part of such esters (or ethers or anhydrides) to be the same or similar so that the presence of (e.g., different) functional groups sets these esters (or ethers or anhydrides) apart.

In some designs, it may be advantageous (for improved cell performance) to use a combination of linear and cyclic anhydrides in the electrolyte.

In some designs (e.g., with cells with high voltage cathodes), it may be advantageous (for improved cell performance) to use sulfones as components of RMP solvents. In some designs, it may be advantageous for the sulfones to comprise from about 17 vol. % to about 97 vol. % of all the RMP solvents in the electrolyte formulation. In some designs, it may be advantageous for the sulfones to comprise both cyclic and linear (or, more generally, not cyclic) sulfones.

The above-described exemplary nanocomposite particles (e.g., anode or cathode particles) may generally be of any shape (e.g., near-spherical, cylindrical, plate-like, have a random shape, etc.) and of any size. The maximum size of the particle may depend on the rate performance requirements, on the rate of the ion diffusion into the partially filled particles, and/or on other parameters. For most applications though that the average diffusion distance from the solid-electrolyte interphase (e.g., from the surface of the composite particles) to the inner core of composite the particles may be smaller than 10 micron for the optimal performance.

Some aspects of this disclosure may also be applicable to conventional intercalation-type electrodes and provide benefits of improved rate performance or improved stability, particularly for electrodes with medium and high capacity loadings (e.g., greater than 3 mAh/cm$^2$).

In an example, the "size" of a nanocomposite particle may be determined in any of a variety of ways. In one example, the size of an individual particle may refer to the diameter of the particle if the particle is spherical or near-spherical. In another example, the size of an individual particle may refer to the diameter of an equivalent volume sphere (e.g., a representative same-volume sized sphere of the particle) of the particle if the particle is non-spherical (e.g., spheroidal, oblong, etc.). If the equivalent volume sphere approach is used, the total pore volume from the particle is retained in the equivalent volume sphere of the particle. In yet another example, for an irregularly shaped particle (e.g., an oblong particle), the size of an individual particle may refer to a smallest dimension of the particle (e.g., width) or a length of the particle (e.g., length). Hence, the various particle size ranges described with respect to embodiments of the disclosure may refer to sizes determined in accordance with any of the above-noted methodologies, based on the shapes and/or other characteristics of the respective particles.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li-ion battery cell, comprising:

a porous Si-comprising anode electrode with an areal capacity loading in a range of 2 mAh/cm$^2$ to 10 mAh/cm$^2$, and comprising: silicon-carbon (Si—C) nanocomposite anode particles, and a binder, wherein:

the Si—C nanocomposite anode particles: (a) exhibit an average particle size in a range of 4 microns to 14 microns, (b) exhibit true density in a range from 1.2 g/cc to 2.0 g/cc, and (d) exhibit volume changes from 4 vol. % to 180 vol. % during one or more charge-discharge cycles of the Li-ion battery cell, a total open pore volume fraction of the porous Si-comprising anode electrode ranges from 5 vol. % to 35 vol. %, and a total weight fraction of the binder ranges from 2 wt. % to 12 wt. %;

a porous cathode electrode comprising lithium cobalt oxide (LCO) cathode particles and/or lithium nickel cobalt manganese oxide (NCM) cathode particles;

a separator electrically separating the porous Si-comprising anode electrode and the porous cathode electrode; and an electrolyte ionically coupling the porous Si-comprising anode electrode and the porous cathode electrode and at least partially filling pores in the porous Si-comprising anode electrode, the cathode electrode and the separator, wherein:

the electrolyte comprises $LiPF_6$ and an electrolyte solvent composition, the electrolyte solvent composition comprises (i) a low-melting point solvent composition comprising one or more esters with an average number of carbon atoms per molecule ranging between 5 and 6 and a chemical formula selected from: $C_5H_{10}O_2$ and/or $C_6H_{12}O_2$; (ii) a regular-melting point solvent composition comprising two or more carbonates selected from: vinylene carbonate (VC), fluoroethylene carbonate (FEC), ethylene carbonate (EC), propylene carbonate (PC), and diethyl carbonate (DEC); and (iii) a nitrile solvent-comprising additive composition, the low-melting point solvent composition has a melting point in a range from −140° C. to less than −60° C., and the regular-melting point solvent composition has a melting point in a range from −60° C. to +30° C.

2. The Li-ion battery cell of claim 1, wherein the Si—C nanocomposite anode particles exhibit specific capacity in a range from about 650 mAh/g to about 2700 mAh/g.

3. The Li-ion battery cell of claim 1, wherein the Si—C nanocomposite anode particles exhibit specific surface area below 15 $m^2/g$.

4. The Li-ion battery cell of claim 1, wherein the electrolyte comprises at least one lithium salt in addition to $LiPF_6$.

5. The Li-ion battery cell of claim 4, wherein the at least one lithium salt comprises fluorine.

6. The Li-ion battery cell of claim 4, wherein the at least one lithium salt comprises sulfur.

7. The Li-ion battery cell of claim 4, wherein the at least one lithium salt comprises lithium bis(fluorosulfonyl)imide (LiFSI).

8. The Li-ion battery cell of claim 1, wherein the low-melting point solvent composition comprises ethyl propionate.

9. The Li-ion battery cell of claim 1, wherein the low-melting point solvent composition comprises propyl propionate.

10. The Li-ion battery cell of claim 9, wherein the low-melting point solvent composition further comprises ethyl propionate.

11. The Li-ion battery cell of claim 1, wherein the low-melting point solvent composition comprises from around 20 to about 70 vol. % of all solvents in the electrolyte.

12. The Li-ion battery cell of claim 1, wherein the low-melting point solvent composition comprises 50 vol. % or more of the $C_5H_{10}O_2$.

13. The Li-ion battery cell of claim 1, wherein the regular-melting point solvent composition comprises propylene carbonate (PC).

14. The Li-ion battery cell of claim 1, wherein the regular-melting point solvent composition comprises each of the following cyclic carbonate solvents: vinylene carbonate (VC), fluoroethylene carbonate (FEC), ethylene carbonate (EC), and propylene carbonate (PC).

15. The Li-ion battery cell of claim 1, wherein the regular-melting point solvent composition comprises one or more cyclic carbonates in the range from about 10 vol. % to about 50 vol. % of all solvents in the electrolyte.

16. The Li-ion battery cell of claim 1, wherein the regular-melting point solvent composition comprises diethyl carbonate (DEC).

17. The Li-ion battery cell of claim 1, wherein the nitrile solvent-comprising additive composition comprises one or more dinitriles.

18. The Li-ion battery cell of claim 17, wherein the one or more dinitriles comprise adiponitrile (ADN).

19. The Li-ion battery cell of claim 1, wherein the nitrile solvent comprising additive composition contributes to less than 10 vol. % of all solvents in the electrolyte.

20. The Li-ion battery cell of claim 1, wherein the total open pore volume fraction of the porous Si-comprising anode electrode ranges from about 5 vol. % to about 25 vol. %.

21. The Li-ion battery cell of claim 1, wherein the areal capacity loading is in a range of 3 $mAh/cm^2$ to 10 $mAh/cm^2$.

22. The Li-ion battery cell of claim 1, wherein the areal capacity loading is in a range of 4 $mAh/cm^2$ to 10 $mAh/cm^2$.

* * * * *